(12) United States Patent (10) Patent No.: US 12,615,329 B2

Hu (45) Date of Patent: Apr. 28, 2026

(54) FUNCTION CONFLICT PROCESSING METHOD AND APPARATUS, ELECTRONIC DEVICE, AND READABLE STORAGE MEDIUM

(71) Applicant: HUAWEI TECHNOLOGIES CO., LTD., Shenzhen (CN)

(72) Inventor: Yu Hu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 18/157,656

(22) Filed: Jan. 20, 2023

(65) Prior Publication Data

US 2023/0156112 A1 May 18, 2023

Related U.S. Application Data

(63) Continuation of application No. PCT/CN2021/106874, filed on Jul. 16, 2021.

(30) Foreign Application Priority Data

Jul. 21, 2020 (CN) .......................... 202010704068.3

(51) Int. Cl.
*H04M 1/72409* (2021.01)

(52) U.S. Cl.
CPC ............................. *H04M 1/724098* (2022.02)

(58) Field of Classification Search
CPC ....... H04M 1/724098; H04M 1/72469; H04M 1/6075; B60R 11/02
See application file for complete search history.

(56) References Cited

U.S. PATENT DOCUMENTS

| 9,955,331 B2 * | 4/2018 | Hrabak ................... H04W 4/80 |
| 10,913,353 B2 * | 2/2021 | Kim ........................ B60R 16/02 |
| 2005/0075128 A1 | 4/2005 | Diedrich et al. |
| 2007/0238475 A1 * | 10/2007 | Goedken ............... H04W 8/005 |
| | | 455/512 |

(Continued)

FOREIGN PATENT DOCUMENTS

| CN | 102573125 A | 7/2012 |
| CN | 204145710 U | 2/2015 |

(Continued)

OTHER PUBLICATIONS

Extended European Search Report in European Appln No. 21846723. 1, dated Nov. 2, 2023, 7 pages.

(Continued)

*Primary Examiner* — Angelica Perez

(74) *Attorney, Agent, or Firm* — Fish & Richardson P.C.

(57) ABSTRACT

This disclosure provides function conflict processing methods and apparatuses. In an implementation, a method includes: receiving, from a first device and by a second device, projection data and first status information of a first function of the first device, wherein the first status information indicates a working status of the first function of the first device, and in response to determining that: (1) the first status information indicates that the first function of the first device is in a working state and (2) a first function of the second device is in a working state, processing, by the second device, a conflict of the first function.

14 Claims, 15 Drawing Sheets

Second device

First device

(56)     References Cited

U.S. PATENT DOCUMENTS

2008/0077310 A1*   3/2008  Murlidar .............. G08G 1/0962
                                                        701/117
2011/0250920 A1*  10/2011  Shimizu ............ H04W 72/1215
                                                        455/512
2012/0259440 A1   10/2012  Zhang
2023/0229375 A1*   7/2023  Niu ....................... G06F 3/1454
                                                        345/589

FOREIGN PATENT DOCUMENTS

| | | |
|---|---|---|
| CN | 104792330 A | 7/2015 |
| CN | 105790802 A | 7/2016 |
| CN | 111083274 A | 4/2020 |
| CN | 111123338 A | 5/2020 |
| CN | 111787392 A | 10/2020 |

OTHER PUBLICATIONS

International Search Report and Written Opinion in International Appln. No. PCT/CN2021/106874, mailed on Sep. 15, 2021, 22 pages (with English translation).

* cited by examiner

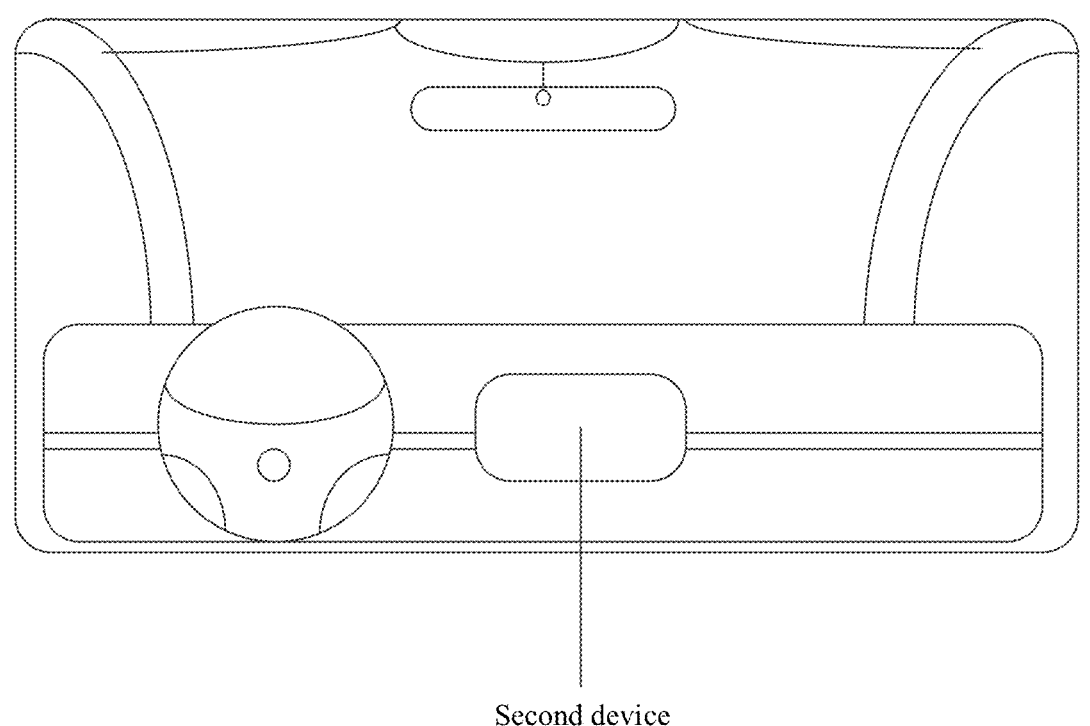
Second device
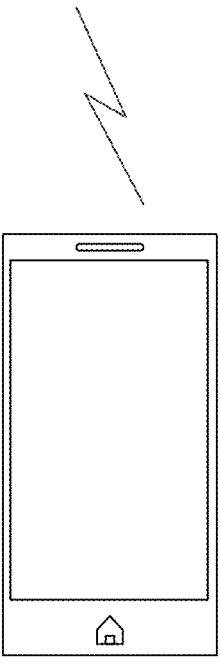
First device
FIG. 1

| Exit | 10 kilometers<br>26 minutes<br>arrival time 20:02 | Set |

| Exit | 12 kilometers<br>30 minutes<br>arrival time 20:00 | Set |

Go straight 300
meters and turn right

Turn left to enter
Avenue A

Turn left to enter Avenue A

C

+

−

Exit  12 kilometers 30 minutes  Set
arrival time 20:00

MM DD, 2019
Monday

Figure 14:
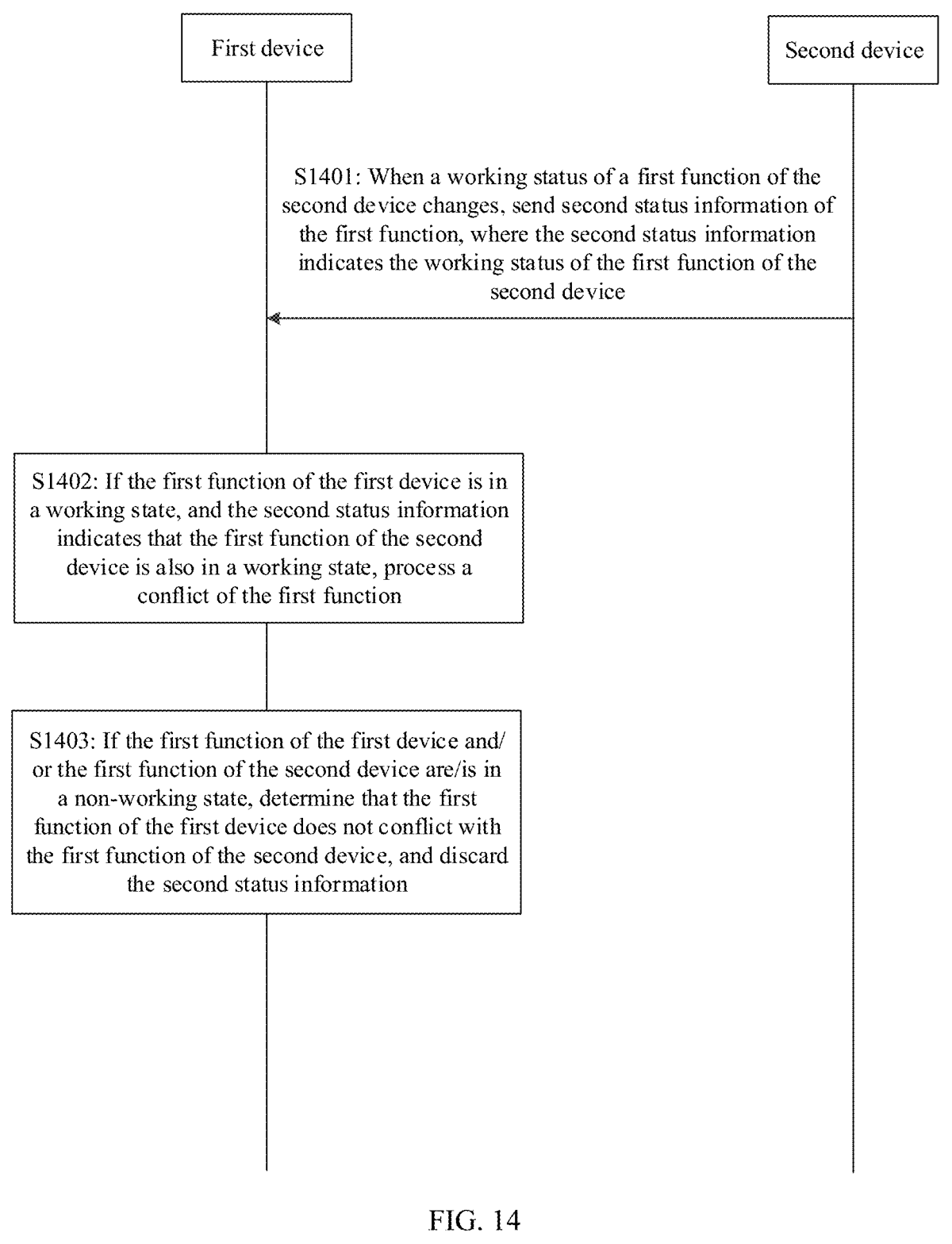

First device

Second device

S1401: When a working status of a first function of the second device changes, send second status information of the first function, where the second status information indicates the working status of the first function of the second device S1402: If the first function of the first device is in a working state, and the second status information indicates that the first function of the second device is also in a working state, process a conflict of the first function S1403: If the first function of the first device and/ or the first function of the second device are/is in a non-working state, determine that the first function of the first device does not conflict with the first function of the second device, and discard the second status information

FUNCTION CONFLICT PROCESSING METHOD AND APPARATUS, ELECTRONIC DEVICE, AND READABLE STORAGE MEDIUM

CROSS-REFERENCE TO RELATED APPLICATIONS

This application is a continuation of International Application No. PCT/CN2021/106874, filed on Jul. 16, 2021, which claims priority to Chinese Patent Application No. 202010704068.3, filed on Jul. 21, 2020. The disclosures of the aforementioned applications are hereby incorporated by reference in their entireties.

TECHNICAL FIELD

Embodiments of this application relate to in-vehicle interconnection technologies, and in particular, to a function conflict processing method and apparatus, an electronic device, and a readable storage medium.

BACKGROUND

Currently, head units may implement a plurality of functions including call answering, navigation, weather viewing, and music listening. However, functions of the head units are relatively simple compared with functions of terminal devices.

In the conventional technology, a technical solution of projecting an interface of a terminal device to a head unit is provided. After projecting the interface of the terminal device to the head unit, a user may view, on the head unit, the interface displayed on the terminal device, so as to use, on the head unit, a function applied to the terminal device.

After the terminal device is projected to the head unit, for functions such as a call function and a navigation function, hardware modules including a microphone and a speaker in a vehicle are used to implement voice playing and receiving. If a function of the terminal device that is projected to the head unit conflicts with an original function of the head unit, the user cannot use the function normally. For example, when the user is using the microphone and the speaker of the head unit to answer a call of the terminal device, if the head unit receives an incoming call, the user cannot normally answer the call of the terminal device.

SUMMARY

Embodiments of this application provide a function conflict processing method and apparatus, an electronic device, and a readable storage medium, to process a function conflict between a first device and a second device, so that a user can normally use a function.

According to a first aspect, an embodiment of this application provides a function conflict processing method. The method may be applied to a second device, or may be applied to a chip in a second device. The following describes the method by using an example in which the method is applied to the second device. In this method, after an interface of a first device is projected to the second device, the second device may receive projection data from the first device and first status information of a first function of the first device, where the first status information indicates a working status of the first function of the first device. A difference from the current technical solution is that in this embodiment of this application, when the interface of the first device is projected to the second device, the first device not only needs to send the projection data to the second device, but also sends the first status information of the first function of the first device to the second device. The first device sends the first status information of the first function of the first device to synchronize the working status of the first function of the first device to the second device, so that when there is a conflict of the first function, the second device can process the conflict of the first function. If the first function of the second device is in a working state, and the first status information indicates that the first function of the first device is also in a working state, the second device may determine that the first function of the first device conflicts with the second function of the second device, and the second device may process a conflict of the first function.

In this embodiment of this application, after the interface of the first device is projected to the second device, the first device and the second device may send status information of the first function of the respective devices to each other, so that status information of the first function of the first device and status information of the first function of the second device are shared. In this way, when the first function of the first device conflicts with the first function of the second device, the second device can process the function conflict, so that a user can normally use the function.

It should be understood that, in this embodiment of this application, an occasion at which the first device sends the projection data and the first status information of the first function of the first device to the second device may be as follows: After the first device is connected to the second device, when the interface of the first device is projected to the second device, the first device needs to send the projection data to the second device. In this case, the second device may send the first status information of the first function to the second device when sending the projection data. In this embodiment of this application, when the first device sends status information of a function to the second device for the first time, the first device may send status information of functions of the first device to the second device. The functions may be all functions of the first device, or functions that are of the first device and that are in a working state. However, it should be noted that the functions include the first function, and the status information of the functions includes the first status information of the first function.

In addition, in this embodiment of this application, an occasion at which the first device sends the projection data and the first status information of the first function of the first device to the second device may alternatively be as follows: When a working status of the first function of the first device changes, the first device sends the first status information of the first function of the first device to the second device. It should be noted that in the two manners, the projection data sent by the first device to the second device may be different. For example, when the first device sends status information of a function to the second device for the first time, the first device may send projection data of a home screen of the first device to the second device. When the working status of the first function of the first device changes, the projection data sent by the first device to the second device may be projection data of an interface of an application in the first device.

The foregoing is a process of sending the first status information of the first function of the first device to the second device by the first device. It should be noted that in this embodiment of this application, the second device may also send second status information of the first function of the second device to the first device. For example, the second device may send the second status information of the first function to the first device when a working status of the first function of the second device changes. The second status information indicates the working status of the first function of the second device. In other words, in this embodiment of this application, the first device and the second device may share status information of respective functions, so that both the first device and the second device can determine whether there is a conflict between the functions of the two devices, and further process the conflict of the first function. It should be understood that in this embodiment of this application, the first device and the second device may process the conflict of the first function in a same manner. It should be understood that an example in which the second device process the conflict of the first function is used for description herein. For details, refer to the following description.

The second device may process a conflict of the first function in a preset processing manner corresponding to the first function. It should be understood that in this embodiment of this application, for different first functions, preset processing manners corresponding to the first functions may be used for processing, instead of using a same processing manner for all function conflicts. According to the function conflict processing method in this embodiment of this application, for different functions, processing manners suitable for different functions may be used to process a function conflict, so that a user requirement is better met, and user experience is improved.

For example, when the first function is a navigation function or a voice function, in this embodiment of this application, a manner in which the second device processes the conflict of the first function may be as follows: The second device stops performing the first function of the second device, and outputs the projection data. When the second device receives the first status information from the first device, the first function of the second device is already in a working state, and the first function that is performed later is probably required by a user, because otherwise the user does not repeatedly enable two same functions. Therefore, in this embodiment of this application, the second device that first performs the first function may stop performing the first function of the second device.

For example, when the first function is a call function, from a perspective of use by a user, both a call function executed on the first device and a call function executed on the second device are relatively important to the user. If a call function conflict occurs, exiting a call function of any device affects user experience. Therefore, a manner in which the second device processes the conflict of the first function may be as follows: The second device performs the first function of the second device, and sends an occupation message to the first device, where the occupation message indicates the first device to perform the first function by using a hardware module of the first device. In other words, when the first function is the call function, the first device may execute the call function by using the hardware module of the first device, and the second device continues to execute the call function by using a hardware module of the second device.

The foregoing embodiment describes a technical solution when the first function of the second device conflicts with the first function of the first device. It should be noted that in this embodiment of this application, if the first function of the second device and/or the first function of the first device are/is in a non-working state, the second device determines that the first function of the second device does not conflict with the first function of the first device. If the first function of the second device does not conflict with the first function of the first device, and the first function is the navigation function or the voice function, the second device discards the first status information; or if the first function is the call function, the second device stores the first status information.

It should be noted that in this embodiment of this application, the second device stores the first status information of the call function because in this embodiment of this application, a function control may be disposed on the second device or a vehicle (or another electronic device) to which the second device belongs. After the interface of the first device is projected to the second device, the function control may be triggered to implement reverse control. To be specific, when the user operates the function control, the second device may be triggered to process the call function of the first device. When the user triggers the function control, the second device may perform different processing on the call function of the first device based on the first status information of the call function and an operation action of the user.

According to a second aspect, an embodiment of this application provides a function conflict processing method. The method may be applied to a first device, or may be applied to a chip in a first device. The following describes the method by using an example in which the method is applied to the first device. According to the method, the first device sends projection data and first status information of a first function of the first device to a second device, where the first status information indicates a working status of the first function of the first device.

In a possible implementation, that the first device sends the first status information to the second device includes: When an interface of the first device is projected to the second device, and the first device sends status information of a function to the second device for the first time, the first device sends status information of functions of the first device to the second device, where the functions include the first function, and the status information of the functions includes the first status information. Alternatively, the first device sends the first status information to the second device when an interface of the first device is projected to the second device and the working status of the first function of the first device changes.

In a possible implementation, the first device receives second status information of the first function of the second device from the second device, where the second status information is sent when a working status of the first function of the second device changes, and the second status information indicates the working status of the first function of the second device. If the first function of the first device is in a working state, and the second status information indicates that the first function of the second device is also in a working state, the first device processes a conflict of the first function.

In a possible implementation, that the first device processes the conflict of the first function includes: The first device processes the conflict of the first function in a preset processing manner corresponding to the first function. It should be understood that, in this embodiment of this application, for a manner in which the first device processes the conflict of the first function, refer to the foregoing related description of processing, by the second device, the conflict of the first function.

In a possible implementation, the preset processing manner corresponding to the first function includes: The first device stops performing the first function of the first device.

In a possible implementation, the first function is any one of the following: a navigation function or a voice function.

In a possible implementation, the preset processing manner corresponding to the first function includes: The first device performs the first function by using a hardware module of the first device.

In a possible implementation, the first function is a call function.

In a possible implementation, the method further includes: If the first function of the first device and/or the first function of the second device are/is in a non-working state, the first device determines that the first function of the first device does not conflict with the first function of the second device, and the first device discards the second status information.

In a possible implementation, the method further includes: If the first device receives an occupation message from the second device, the first device performs the first function by using the hardware module of the first device.

According to a third aspect, an embodiment of this application provides a function conflict processing apparatus. The function conflict processing apparatus may be the second device according to the first aspect. The function conflict processing apparatus may include a transceiver module and a processing module. The transceiver module is configured to receive projection data from a first device and first status information of a first function of the first device, where the first status information indicates a working status of the first function of the first device. The processing module is configured to: if the first function of the second device is in a working state, and the first status information indicates that the first function of the first device is also in a working state, process a conflict of the first function.

In a possible implementation, the processing module is specifically configured to process the conflict of the first function in a preset processing manner corresponding to the first function.

In a possible implementation, the processing module is specifically configured to: stop performing the first function of the second device, and output the projection data.

In a possible implementation, the first function is any one of the following: a navigation function or a voice function.

In a possible implementation, the processing module is specifically configured to perform the first function of the second device, and send an occupation message to the first device, where the occupation message indicates the first device to use a hardware module of the first device to perform the first function.

In a possible implementation, the first function is a call function.

In a possible implementation, the first status information is sent when the working status of the first function of the first device changes; or the first status information is status information in status information of functions that is sent by the first device when the first device sends status information of a function to the second device for the first time.

In a possible implementation, the processing module is further configured to: if the first function of the second device and/or the first function of the first device are/is in a non-working state, determine that the first function of the second device does not conflict with the first function of the first device, where if the first function is the navigation function or the voice function, the first status information is discarded; or if the first function is the call function, the first status information is stored.

In a possible implementation, the transceiver module is specifically configured to: if a working status of the first function of the second device changes, send second status information of the first function to the first device, where the second status information indicates the working status of the first function of the second device.

According to a fourth aspect, an embodiment of this application provides a function conflict processing apparatus. The function conflict processing apparatus may be the first device according to the second aspect. The function conflict processing apparatus may include a transceiver module and a processing module. The transceiver module is configured to send projection data and first status information of a first function of the first device to a second device, where the first status information indicates a working status of the first function of the first device.

In a possible implementation, the transceiver module is specifically configured to: when an interface of the first device is projected to the second device, and the first device sends status information of a function to the second device for the first time, send status information of functions of the first device to the second device, where the functions include the first function, and the status information of the functions includes the first status information. Alternatively, the transceiver module is specifically configured to: when an interface of the first device is projected to the second device, and the working status of the first function of the first device changes, send the first status information to the second device.

In a possible implementation, the transceiver module is further configured to: receive second status information that is from the second device and that is of the first function of the second device, where the second status information is sent when a working status of the first function of the second device changes, and the second status information indicates the working status of the first function of the second device.

Correspondingly, the processing module is configured to: if the first function of the first device is in a working state, and the second status information indicates that the first function of the second device is also in a working state, process a conflict of the first function.

In a possible implementation, the processing module is specifically configured to process the conflict of the first function in a preset processing manner corresponding to the first function.

In a possible implementation, the processing module is specifically configured to stop performing the first function of the first device.

In a possible implementation, the first function is any one of the following: a navigation function or a voice function.

In a possible implementation, the processing module is specifically configured to perform the first function by using a hardware module of the first device.

In a possible implementation, the first function is a call function.

In a possible implementation, the processing module is further configured to: if the first function of the first device and/or the first function of the second device are/is in a non-working state, determine, by the first device, that the first function of the first device does not conflict with the first function of the second device, where the first device discards the second status information.

In a possible implementation, the processing module is further configured to: if the first device receives an occupation message from the second device, perform the first function by using the hardware module of the first device.

For implementation principles and technical effects of the function conflict processing apparatuses in the third aspect and the fourth aspect of embodiments of this application, refer to related descriptions of the first aspect. Details are not described herein again.

According to a fifth aspect, an embodiment of this application provides an electronic device. The electronic device may be the second device in the first aspect and the first device in the second aspect. The electronic device includes: a processor, a memory, and a transceiver. The transceiver is coupled to the processor, and the processor controls a sending and receiving action of the transceiver. The memory is configured to store computer executable program code, and the program code includes instructions. When the processor executes the instructions, the instructions enable the electronic device to perform the methods provided in the first aspect and the second aspect.

According to a sixth aspect, an embodiment of this application provides an electronic device, including a unit, a module, or a circuit that is configured to perform the methods provided in the first aspect and the second aspect. The electronic device may be the first device or the second device, or may be a module applied to the first device or the second device, for example, may be a chip applied to the first device or the second device.

According to a seventh aspect, an embodiment of this application provides a chip, where the chip stores a computer program, and when the computer program is executed by the chip, the method provided in the first aspect and the second aspect is implemented.

According to an eighth aspect, an embodiment of this application provides a computer program product including instructions. When the computer program product runs on a computer, the computer is enabled to perform the method according to the first aspect and the second aspect.

According to a ninth aspect, an embodiment of this application provides a computer-readable storage medium, where the computer-readable storage medium stores instructions, and when the instructions are run on a computer, the computer is enabled to perform the method according to the first aspect and the second aspect.

Embodiments of this application provide a function conflict processing method and apparatus, an electronic device, and a readable storage medium. The method includes: A second device receives projection data from a first device and first status information of a first function of the first device, where the first status information indicates a working status of the first function of the first device. If the first function of the second device is in a working state, and the first status information indicates that the first function of the first device is also in a working state, the second device processes a conflict of the first function. In this embodiment of this application, after an interface of the first device is projected to the second device, and when the first function of the first device conflicts with the first function of the second device, both the first device and the second device can process the function conflict, so that a user can normally use the function. In addition, in this embodiment of this application, for different functions, processing manners suitable for different functions may be further used to process a function conflict, so that a user requirement is better met, and user experience is improved.

BRIEF DESCRIPTION OF DRAWINGS

FIG. 1 is a schematic diagram 1 of a scenario to which embodiments of this application are applied;

FIG. 14 is a schematic flowchart of yet another embodiment of a function conflict processing method according to an embodiment of this application;

DESCRIPTION OF EMBODIMENTS

FIG. 1 is a schematic diagram 1 of a scenario to which embodiments of this application are applied. As shown in FIG. 1, the scenario may include a first device and a second device. In FIG. 1 and the following embodiments, an example in which the first device is a mobile phone and the second device is a head unit is used for description. The first device may project an interface of the first device to the second device, so that a user can view the interface of the first device on the second device, that is, a function of the first device can be implemented on the second device. It should be noted that, in this embodiment of this application, a manner in which the first device projects the interface of the first device to the second device may be as follows: After the first device is connected to the second device, the first device may send projection data of a to-be-displayed interface to the second device. After receiving the projection data, the second device may display the interface of the first device based on the projection data. To avoid a conflict between projection control logic for projection of the interface of the first device to the second device and control logic for performing a Bluetooth connection between the first device and the second device, the first device and the second device in this embodiment of this application may not perform a Bluetooth connection. It should be understood that a connection manner between the first device and the second device in this embodiment of this application may include but is not limited to a wired connection or a Wi-Fi point-to-point connection (WiFi-P2P). The first device and the second device may be connected in a wired manner by using a universal serial bus (USB). The foregoing Wi-Fi point-to-point connection may also be referred to as a Wi-Fi direct connection. In this embodiment of this application, a connection process between the first device and the second device and a process of projection of the interface of the first device to the second device are not described in detail. For details, refer to descriptions in the conventional technology.

Figure 2:
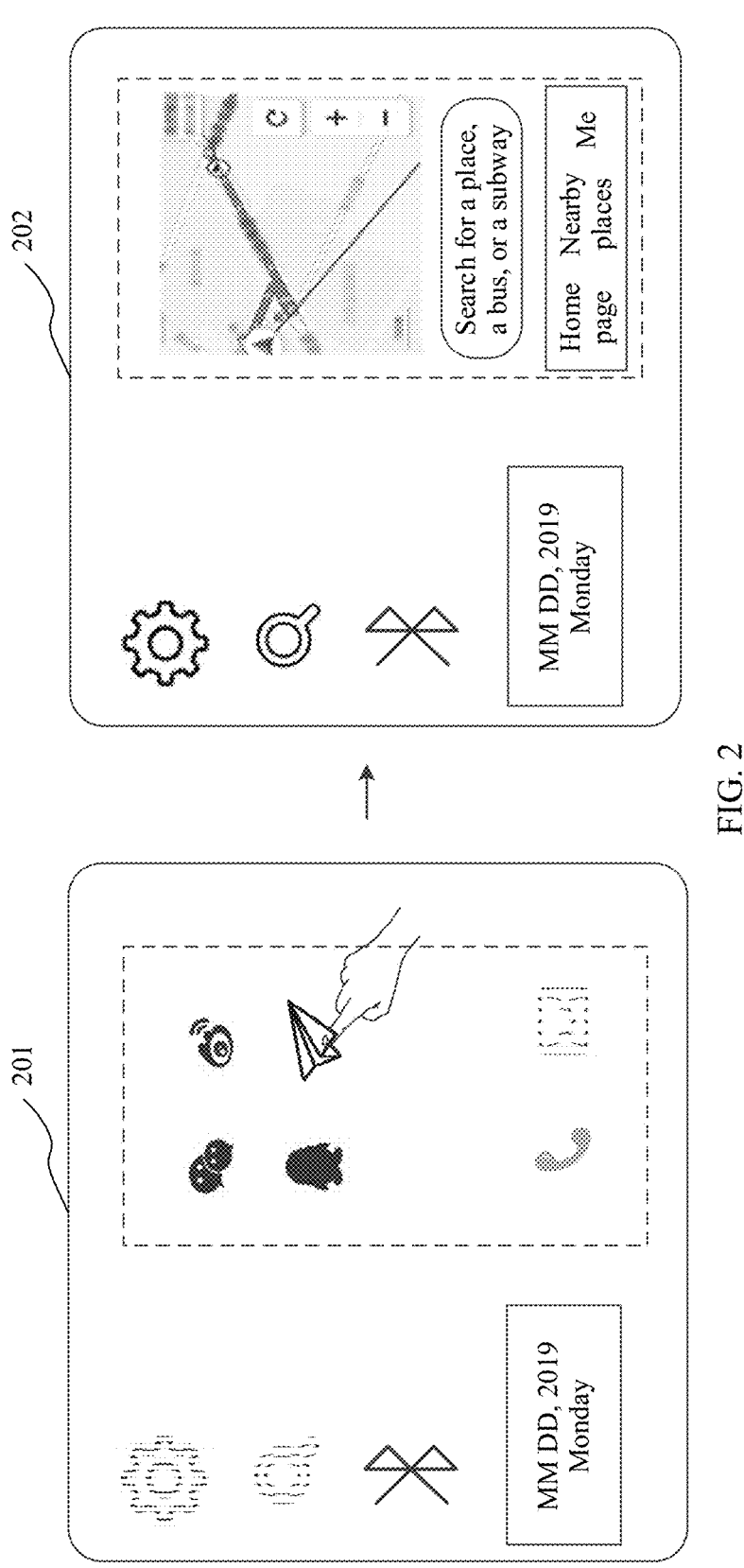
FIG. 2 is a schematic diagram of an interface change of a second device according to an embodiment of this application.

For example, FIG. 2 is a schematic diagram of an interface change of the second device according to an embodiment of this application. The first device may project a home screen or an interface of an application of the first device to the second device. When the first device projects the home screen of the first device to the second device, an interface of the second device may display an original interface of the second device and the home screen of the first device. Alternatively, only the home screen of the first device may be displayed on the interface of the second device. An interface 201 in FIG. 2 is described by using an example in which the original interface of the second device and the home screen of the first device are displayed. It should be understood that icons of applications in the first device may be displayed on the home screen of the first device. When the first device projects the home screen of the first device to the second device, the projection data sent by the first device to the second device may be data related to the home screen of the first device. When a user enables, on the first device, a navigation application in the first device, the first device may display an interface of the navigation application. In this case, the projection data sent by the first device to the second device may be data related to the interface of the navigation application. Correspondingly, the interface 201 of the second device may jump to an interface 202, and the interface of the navigation application may be displayed on the interface 202.

When the interface of the first device is projected to the second device, the second device may output the projection data based on the projection data from the first device. As shown in FIG. 2, that the second device outputs the projection data may be displaying the interface of the first device. That the second device outputs the projection data may alternatively be playing audio of the first device by using a hardware module of the second device, or the like. For example, when the first device projects a navigation interface to the second device, in addition to displaying the navigation interface of the first device, the second device may further play navigation audio by using the hardware module of the second device, for example, play "go straight 200 meters and turn right". If the second device is a head unit, the head unit may play the navigation audio by using a speaker in a vehicle. An existing head unit also has a navigation function. If the head unit is performing the navigation function, the head unit uses a speaker in a vehicle to play navigation audio. If a navigation interface on a mobile phone is projected to the head unit, a navigation function on the mobile phone also uses the speaker in the vehicle to play navigation audio on the mobile phone. In this case, both the mobile phone and the head unit vie to occupy the speaker of the vehicle. Because algorithms of navigation functions in the mobile phone and the head unit are different, navigation paths planned by the mobile phone and the head unit may be different. As a result, a user cannot use navigation normally. For example, the speaker of the vehicle plays the navigation audio of the mobile phone and the navigation audio of the head unit.

Figure 3:
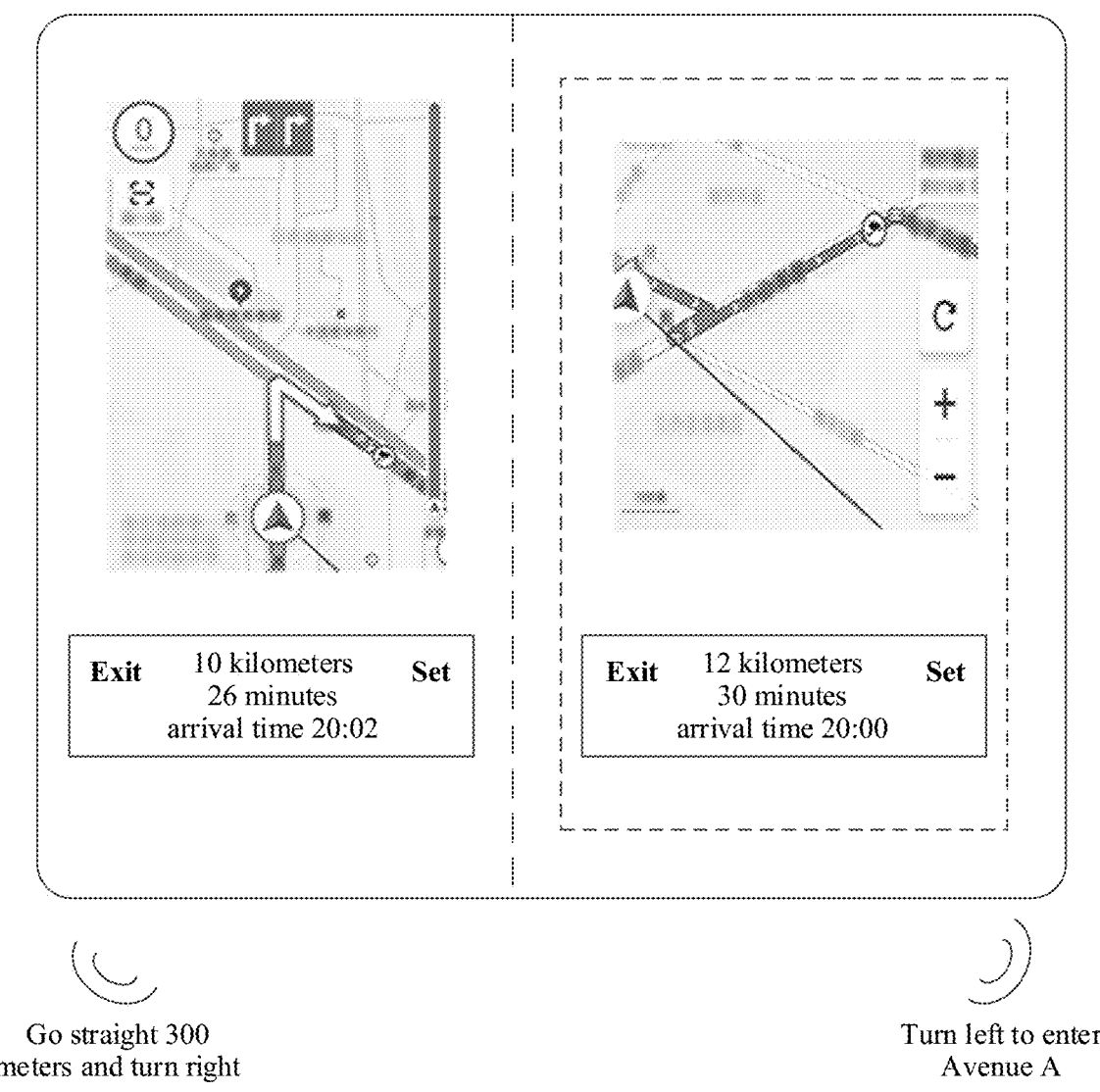
FIG. 3 is a schematic diagram of a scenario.

For example, FIG. 3 is a schematic diagram of a scenario. As shown in FIG. 3, after the interface of the mobile phone is projected to the head unit, the head unit is using the navigation function of the head unit, and the speaker in the vehicle is playing the navigation audio of the head unit. However, the user considers that the navigation of the head unit is not accurate enough, and uses the navigation function of the mobile phone. As shown in FIG. 3, a navigation interface on a left side of the head unit is a navigation interface presented by the navigation function of the head unit, and a navigation interface on a right side of the head unit is a navigation interface obtained through projection of the mobile phone. In this case, the speaker in the vehicle may play the navigation audio of the mobile phone and the head unit at the same time. For example, navigation audio "turn left to enter Avenue A" of the mobile phone and navigation audio "go straight 300 meters and turn right" of the head unit are played at the same time.

Similar to the navigation function, the existing head unit further provides a call function. For example, a calling card may be disposed on the head unit, or when the head unit is connected to the mobile phone through Bluetooth, a call on the mobile phone may be made or received on the head unit. After an interface of the mobile phone is projected to the head unit, if the mobile phone is making a call by using a microphone and the speaker of the vehicle, and the head unit receives an incoming call (for example, an incoming call to the calling card disposed on the head unit, or an incoming call to another mobile phone connected to the head unit through Bluetooth), both the mobile phone and the head unit vie to occupy the microphone and the speaker of the vehicle. As a result, the user cannot normally use the call function. For example, the speaker of the vehicle plays audio of the call on the mobile phone and audio of the call on the head unit at the same time, or the head unit determines that the call function of the mobile phone conflicts with the call function of the head unit, and plays neither audio of the call on the mobile phone nor audio of the call on the head unit. As a result, the user cannot normally use the call function.

In addition, the existing head unit further has a voice function. For example, the user may wake up the head unit in a voice wake-up manner, to perform voice interaction with the head unit. The mobile phone also has a voice function. After an interface of the mobile phone is projected to the head unit, if the mobile phone is using the voice function, the microphone in the vehicle collects a voice of the user, and the speaker in the vehicle plays audio of the mobile phone that responds to the user. However, if the voice function of the head unit is in a working state, there is also a problem that both the mobile phone and the head unit vie to occupy the microphone and the speaker of the vehicle to implement the voice function. This causes a false wake-up or voice recognition inconsistency of the mobile phone and the head unit. For example, the user is using the voice function of the head unit to ask the head unit a question "What is the weather today?". However, in this case, if the voice function of the mobile phone is also in an enabled state, both the mobile phone and the head unit respond to the voice of the user. As a result, the user cannot normally use the voice function.

To resolve a problem of a function conflict between a mobile phone and a head unit, currently, a technical solution is provided. For example, after the mobile phone is projected to the head unit, the mobile phone is in a call. In this case, when the head unit receives an incoming call, the call of the mobile phone is directly hung up. In this technical solution, if a user is making an important call, using a manner of directly hanging up the call may result in poor user experience.

To resolve the foregoing function conflict problem, an embodiment of this application provides a function conflict processing method. After an interface of a first device is projected to a second device, the first device and the second device may send a status of a function of the device to each other. When a function conflict occurs, both the first device and the second device may process the function conflict, so that a user can normally use the function of the device. In addition, in this embodiment of this application, the first device and the second device may further process function conflicts in different processing manners based on different functions, to better meet a user requirement and improve user experience.

It should be understood that the function of the first device in this embodiment of this application may be understood as a system function and/or a function of an application of the first device. For example, a function of the first device may be implemented by enabling an application in the first device, and/or a function built in a system of the first device. For a function of the second device, refer to the description of the function of the first device. Functions of the first device may include but are not limited to the following: basic functions (such as a call function, a map navigation function, a music function, and a voice function), driving safety functions (such as a vehicle key function, a driving care function, and a vehicle service function), service enhancement functions (such as an artificial intelligence function, a smart home function, a video conference function, and a parking service function), and entertainment functions (such as an audio reading function, a social communication function, an audio and video entertainment function, and a simulation game function). It should be noted that both the first device and the second device in this embodiment of this application are electronic devices that can implement a navigation function, a call function, a voice function, and the like. For example, the first device and the second device may be terminal devices, in-vehicle devices (such as head units), intelligent robots, or the like. The terminal device may be user equipment, an access terminal, a subscriber unit, a subscriber station, a remote terminal, a mobile device, a user terminal, a terminal, a wireless communications device, a user agent, or a user apparatus. The terminal device may be a mobile phone, a tablet computer (pad), a computer with a wireless transceiver function, a personal digital assistant (PDA), a handheld device with a wireless communication function, a computer or another processing device, a wearable device, a virtual reality (VR) terminal device, an augmented reality (AR) terminal device, a wireless terminal in smart home, a terminal device in a 5G network, a terminal device in a future evolved public land mobile network (PLMN), or the like. This is not limited in embodiments of this application.

Figure 4:
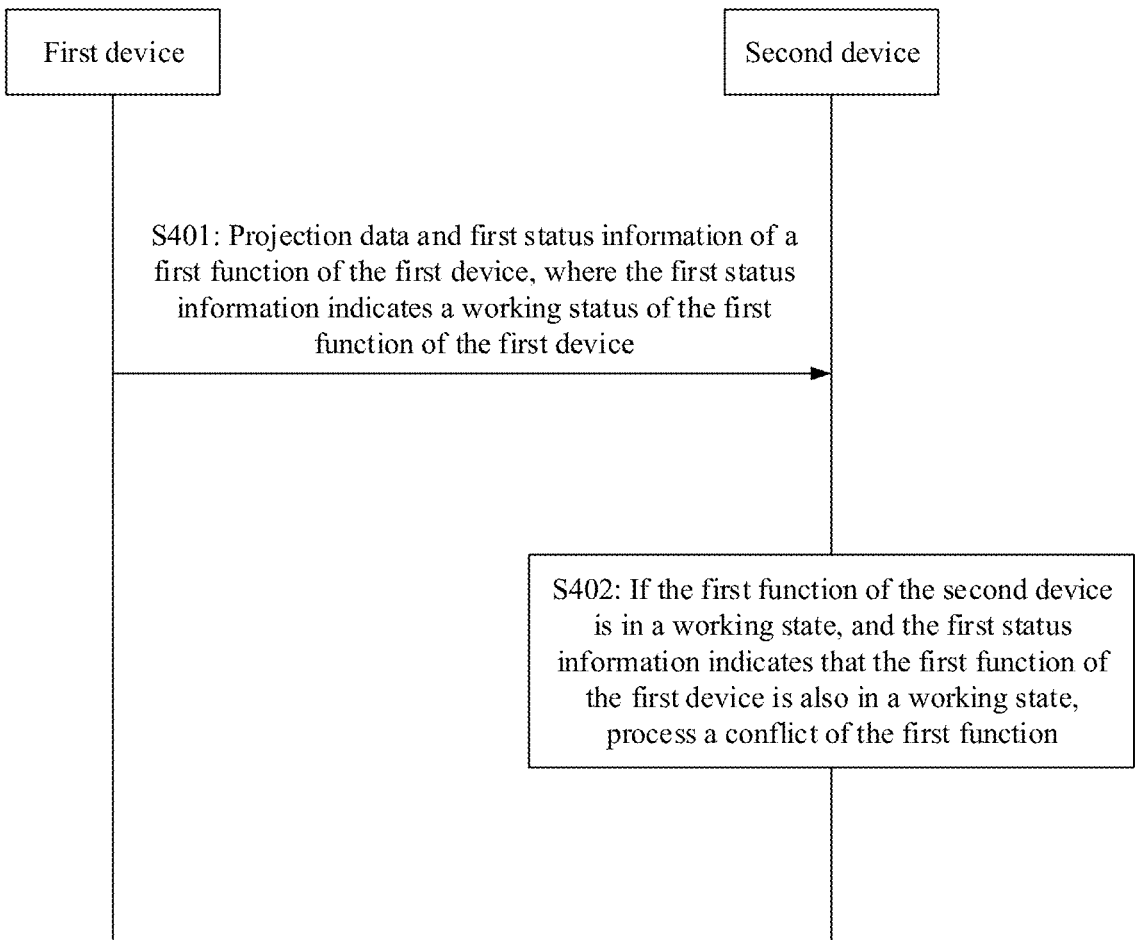
FIG. 4 is a schematic flowchart of an embodiment of a function conflict processing method according to an embodiment of this application.

The following describes, with reference to specific embodiments, a function conflict processing method provided in embodiments of this application. The following several embodiments may be combined with each other, and a same or similar concept or process may not be described repeatedly in some embodiments. FIG. 4 is a schematic flowchart of an embodiment of a function conflict processing method according to an embodiment of this application. As shown in FIG. 4, the function conflict processing method provided in this embodiment of this application may include the following steps.

S401: A second device receives projection data from a first device and first status information of a first function of the first device, where the first status information indicates a working status of the first function of the first device.

S402: If the first function of the second device is in a working state, and the first status information indicates that the first function of the first device is also in a working state, the second device processes a conflict of the first function.

In S401, it should be understood that, after the first device establishes a connection to the second device in this embodiment of this application, an interface of the first device may be projected to the second device. The first device and the second device may be connected in a wired connection or a Wi-Fi point-to-point connection. A manner in which the interface of the first device is projected to the second device may include but is not limited to the following steps: A user taps a projection icon or a projection button on a head unit. The head unit displays a personal identification number (PIN) and sends a connection broadcast. After receiving the broadcast, a mobile phone pops up a head unit discovery box to prompt the user to connect the head unit to the mobile phone. Alternatively, after a user connects a head unit to a mobile phone by using a USB cable, the mobile phone displays a dialog box indicating that the head unit is found, to prompt the user to connect the head unit to the mobile phone. In this embodiment of this application, a manner of projection of the interface of the first device to the second device is not limited.

A difference from the existing technical solution is that in this embodiment of this application, when the interface of the first device is projected to the second device, the first device not only needs to send the projection data to the second device, but also needs to send the first status information of the first function of the first device to the second device. It should be understood that the projection data in this embodiment of this application is data related to the interface of the first device. For example, when the first device projects a home screen of the first device to the second device, the projection data may be data related to the home screen of the first device. The projection data varies with interfaces projected by the first device to the second device, and the projection data is all intended to enable the second device to display the interface of the first device on an interface of the second device based on the projection data, play audio of the first device, and the like.

The first status information indicates the working status of the first function of the first device. For example, the first status information may indicate that the first function is in a working state or a non-working state. For example, when the first function is a navigation function, first status information of the navigation function may be a working state (navigating) or a non-working state (idle). For example, when the first function is a voice function, first status information of the voice function may be a working state (a wakeup state) or a non-working state (idle). For example, when the first function is a call function, first status information of the call function may be a working state (a call, an outgoing call, or an incoming call) or a non-working state (idle). Alternatively, when the first function is the call function, the first status information may further specifically indicate a specific type of the working status of the first function. For example, the first status information may indicate that the call function is in a call state, an outgoing call state, an incoming call state, or the like.

It should be understood that the first status information may include an indication bit such as 1 or 0, to indicate the working status of the first function of the first device. For example, 1 may indicate that the first function is in a working state, and 0 indicates that the first function is in a non-working state. In addition, when the first status information may further specifically indicate the specific type of the working status of the first function, another indication bit may be used for indication. In this embodiment of this application, a manner in which the first status information indicates the working status of the first function of the first device is not limited. It should be noted that a purpose of the first device sending the projection data is to display the interface of the first device on the second device, and a purpose of the first device sending the first status information of the first function of the first device is to synchronize the working status of the first function of the first device to the second device, so that when there is a conflict of the first function, the second device can process the conflict of the first function.

In S402, after receiving the first status information, the second device may obtain the working status of the first function of the first device. The second device may determine, based on a working status of the first function of the second device and the working status of the first function of the first device, whether the first function of the first device conflicts with the first function of the second device. If the first function of the second device is in a working state, and the first status information indicates that the first function of the first device is also in a working state, the second device determines that the first function of the first device conflicts with the first function of the second device, and the second device processes a conflict of the first function.

In this embodiment of this application, before the first device performs the first function, the second device has performed the first function (that is, the first function of the second device is in a working state). Therefore, in this embodiment of this application, a manner in which the second device processes the conflict of the first function may be that the second device that first performs the first function continues to perform the first function, and the first device that performs the first function later exits the first function. Optionally, the second device may send an occupation message to the first device, where the occupation message indicates that the second device is performing the first function, and indicates the first device to exit the first function. For example, if the second device is in a call, and the first device receives an incoming call at this time, the second device may continue the call, and the first device hangs up the call. In this way, a processing manner of the call function does not cause an ongoing call to be suddenly hung up, and user experience can be improved compared with that in the existing technical solution.

However, in an actual application scenario, the first function that is performed later is to a large extent a function that the user requires. For example, the second device is performing the navigation function, and the user may consider that the navigation function of the second device is inaccurate, and therefore the navigation function of the first device is used. In this scenario, when the navigation function of the first device conflicts with the navigation function of the second device, a requirement of the user is better met if the first device performs the navigation function, otherwise the user does not use the navigation function of the first device again. Alternatively, when the second device is performing the voice function, the user may consider that the voice function of the second device responds slowly or responds inaccurately, and therefore the voice function of the first device is used. In this scenario, when a conflict of the voice function occurs, a requirement of the user is better met if the first device performs the voice function, otherwise the user does not use the voice function of the first device again.

In addition, for the call function, from a perspective of use by the user, both the call function performed on the first device and the call function performed on the second device are important to the user. If a conflict of the call function occurs, exiting a call function of any device affects user experience. For example, a head unit is connected to a mobile phone of a user 1 through Bluetooth, and an interface of a mobile phone of a user 2 is projected to the head unit. If the head unit is currently answering a call in the mobile phone of the user 1, and the mobile phone of the user 2 receives an incoming call, a call function is very important for both the user 1 and the user 2. Therefore, either exiting the call function of the head unit or the call function of the mobile phone affects user experience.

Therefore, to further improve user experience, in this embodiment of this application, a preset processing manner suitable for the first function may be preset. When a conflict of the first function occurs, the second device may process the conflict of the first function in the preset processing manner corresponding to the first function. In other words, in this embodiment of this application, for different first functions, when a conflict of the first function occurs, the second device may process the conflict of the first function in different processing manners.

In this embodiment of this application, a possible manner of processing the conflict of the first function by the second device may be as follows: When the first function is the navigation function or the voice function, if the second device receives the first status information and determines that the first function of the first device conflicts with the first function of the second device, the second device may stop performing the first function of the second device, and output the projection data. In other words, the second device stops performing the first function of the second device, and the first device continues to perform the first function, and may display, on the second device, an interface for performing the first function by the first device, and play audio corresponding to the first function by using a hardware module of the second device.

Figure 5:
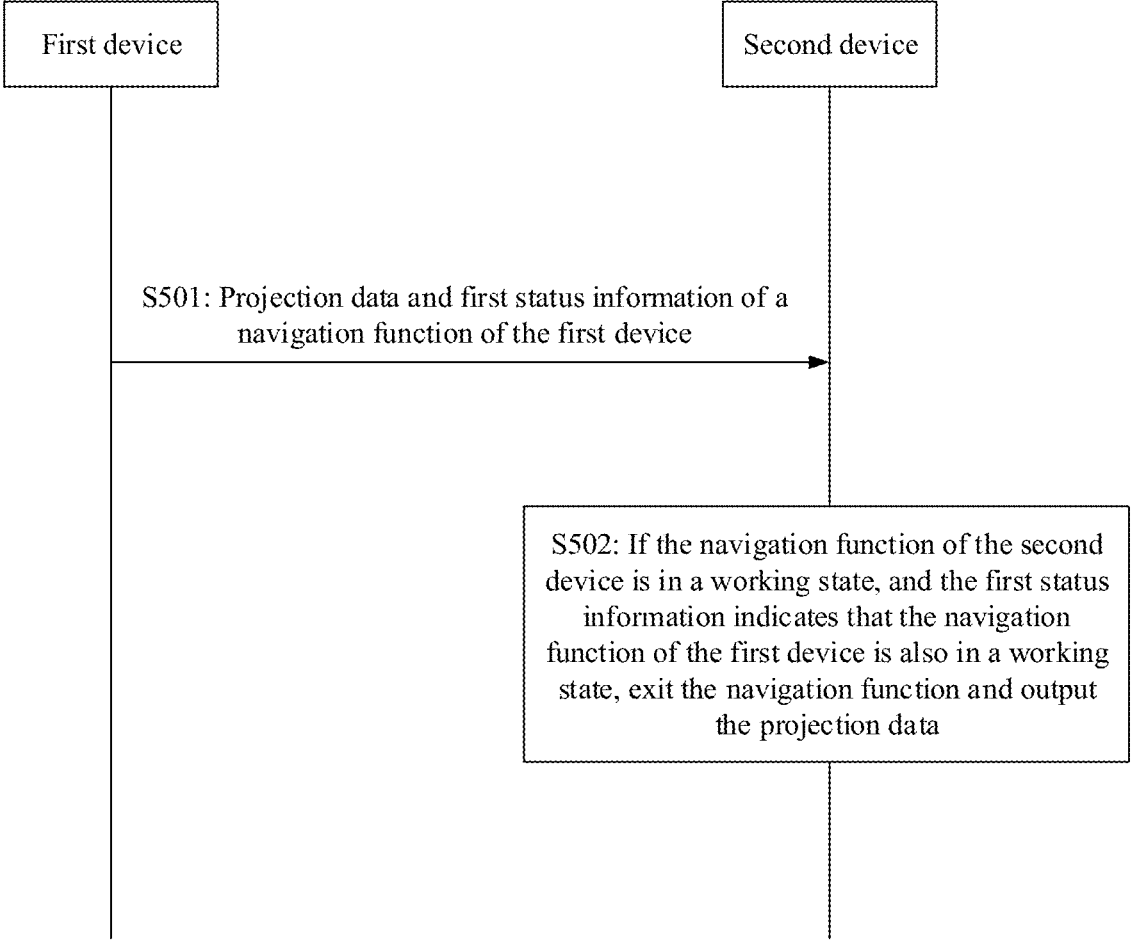
FIG. 5 is a schematic flowchart of navigation function conflict processing according to an embodiment of this application.

FIG. 5 is a schematic flowchart of navigation function conflict processing according to an embodiment of this application. As shown in FIG. 5, when the first function is the navigation function, S401 may be replaced with S501, and S402 may be replaced with S502.

S501: The second device receives projection data from the first device and first status information of the navigation function of the first device.

S502: If the navigation function of the second device is in a working state, and the first status information indicates that the navigation function of the first device is also in a working state, the second device exits the navigation function and outputs the projection data.

After the interface of the mobile phone is projected to the head unit, when the navigation function is performed on the head unit, if the user enables the navigation function of the mobile phone in this case, the head unit exits the navigation function, and the mobile phone continues to perform the navigation function. Correspondingly, that the second device outputs the projection data herein means that the head unit displays an interface of the navigation function of the mobile phone based on the projection data and plays navigation audio by using a speaker in a vehicle.

Figure 6:
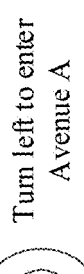
FIG. 6 is a schematic diagram 2 of a scenario according to an embodiment of this application.

For example, FIG. 6 is a schematic diagram 2 of a scenario according to an embodiment of this application. A difference from FIG. 3 lies in that, when the navigation function of the mobile phone conflicts with that of the head unit, the head unit in this embodiment of this application may exit navigation. In an interface shown in FIG. 6, only the navigation interface of the mobile phone on the right side in FIG. 3 is displayed, and the navigation audio "turn left to enter Avenue A" of on the mobile phone is played.

Figure 7:
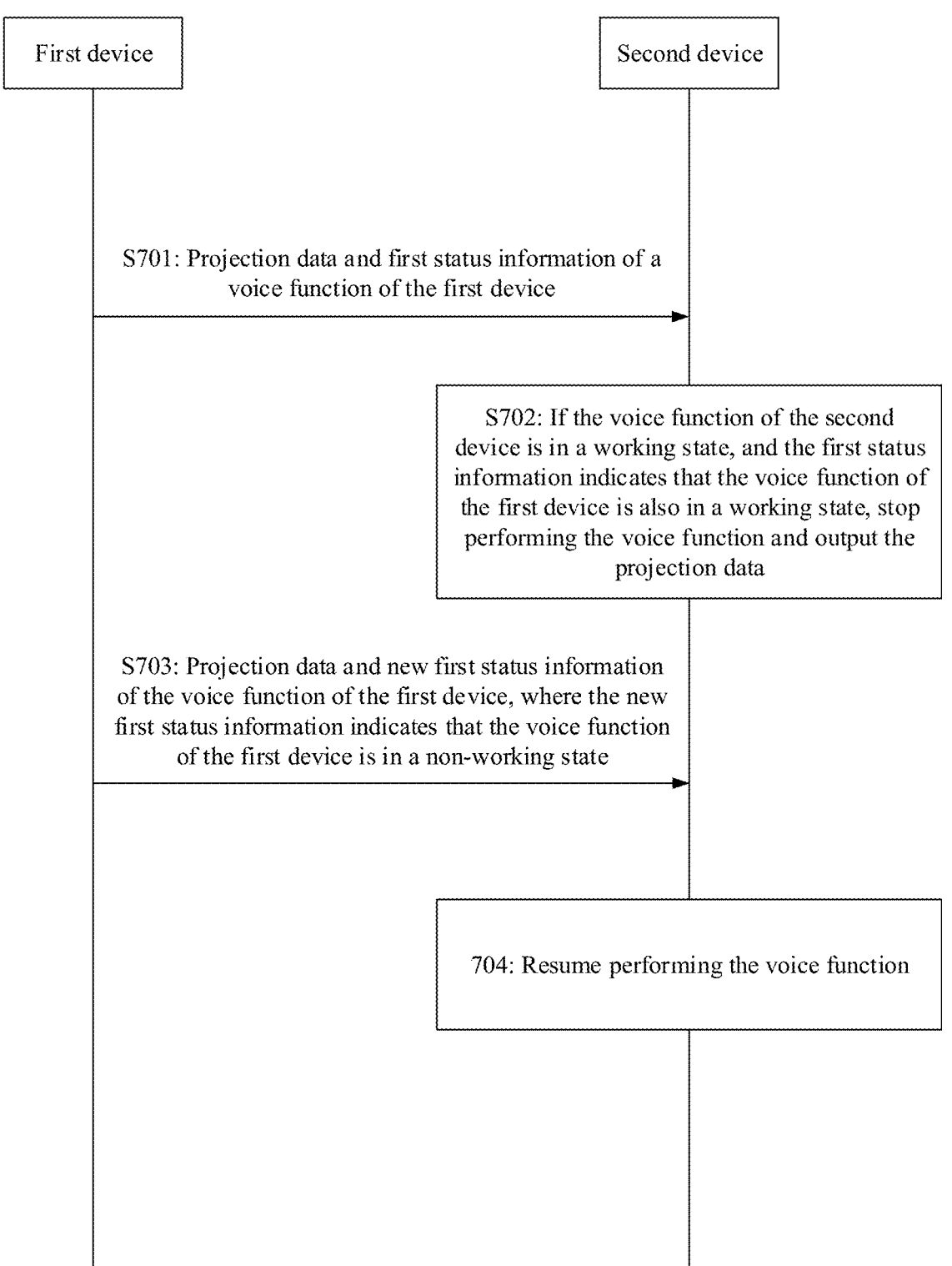
FIG. 7 is a schematic flowchart of voice function conflict processing according to an embodiment of this application.

FIG. 7 is a schematic flowchart of voice function conflict processing according to an embodiment of this application. As shown in FIG. 7, when the first function is the voice function, S401 may be replaced with S701, and S402 may be replaced with S702.

S701: The second device receives projection data from the first device and first status information of the voice function of the first device.

S702: If the voice function of the second device is in a working state, and the first status information indicates that the voice function of the first device is also in a working state, the second device stops performing the voice function and outputs the projection data.

After the interface of the mobile phone is projected to the head unit, when the voice function is performed on the head unit, if the user enables the voice function of the mobile phone in this case, the head unit stops performing the voice function. For example, the head unit may stop receiving sound. Correspondingly, that the second device outputs the projection data herein means that the head unit displays an interface of the voice function of the mobile phone based on the projection data, collects a voice of the user by using an earpiece in a vehicle, and plays response audio of voice interaction with the user by using a speaker in the vehicle.

In this embodiment of this application, another possible manner of processing the conflict of the first function by the second device may be as follows: When the first function is the call function, if the second device receives the first status information and determines that the first function of the first device conflicts with the first function of the second device, the second device may continue to perform the first function of the second device, and send an occupation message to the first device. The occupation message indicates the first device to use a hardware module of the first device to perform the first function.

Figure 8:
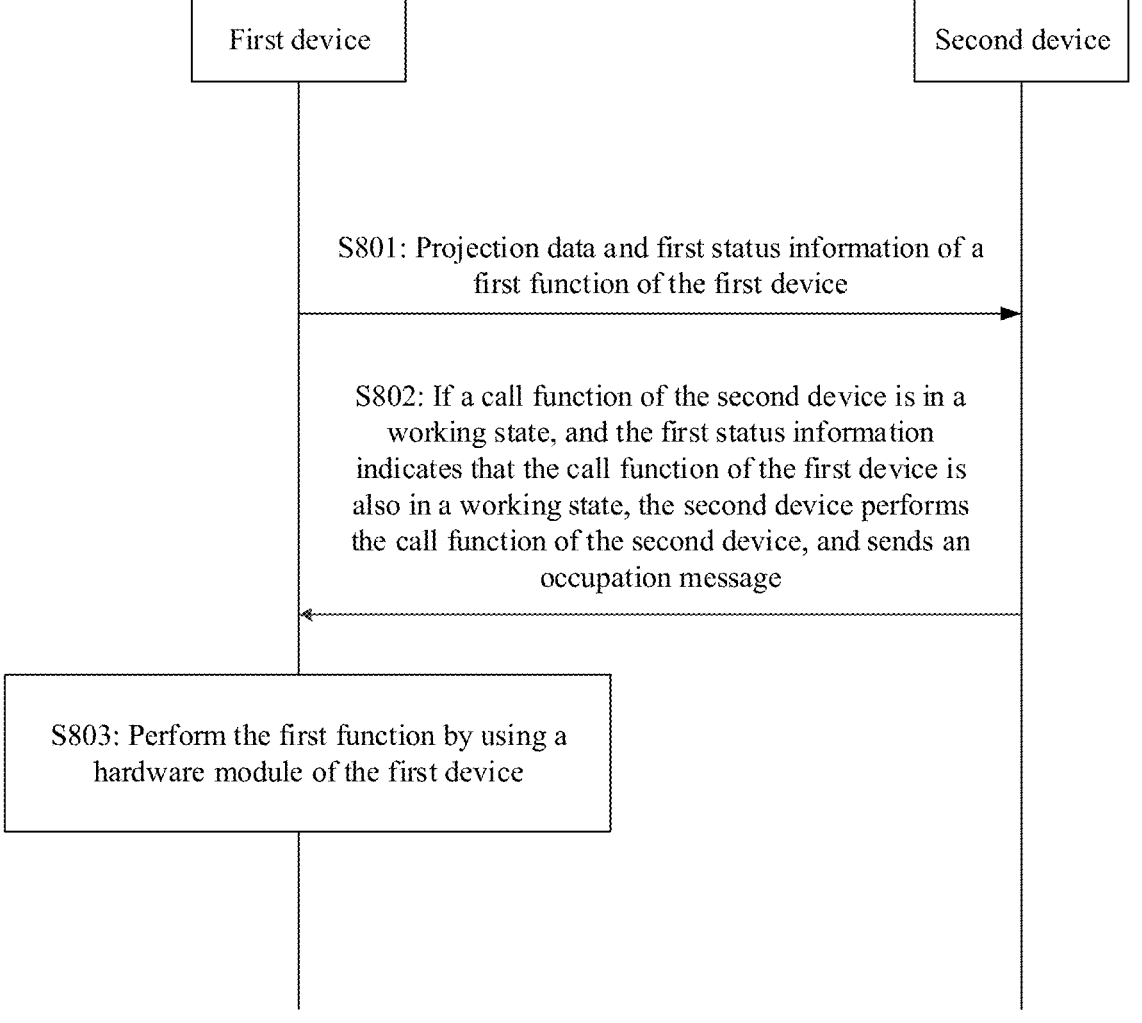
FIG. 8 is a schematic flowchart of call function conflict processing according to an embodiment of this application.

FIG. 8 is a schematic flowchart of call function conflict processing according to an embodiment of this application. As shown in FIG. 8, when the first function is the call function, S401 may be replaced with S801, and S402 may be replaced with S802 and S803.

S801: The second device receives projection data from the first device and first status information of the call function of the first device.

S802: If the call function of the second device is in a working state, and the first status information indicates that the call function of the first device is also in a working state, the second device performs the call function of the second device, and sends an occupation message to the first device.

S803: The first device performs the first function by using a hardware module of the first device.

For example, after the interface of the mobile phone is projected to the head unit, when the call function is performed on the head unit, if the mobile phone of the user receives an incoming call, the head unit determines that a conflict of the call function occurs, and the head unit may continue to perform the call function of the head unit and send an occupation message to the mobile phone. After receiving the occupation message, the mobile phone may use an earpiece of the mobile phone to collect a voice of the user, and use a speaker of the mobile phone to play audio of the call.

Figure 9:
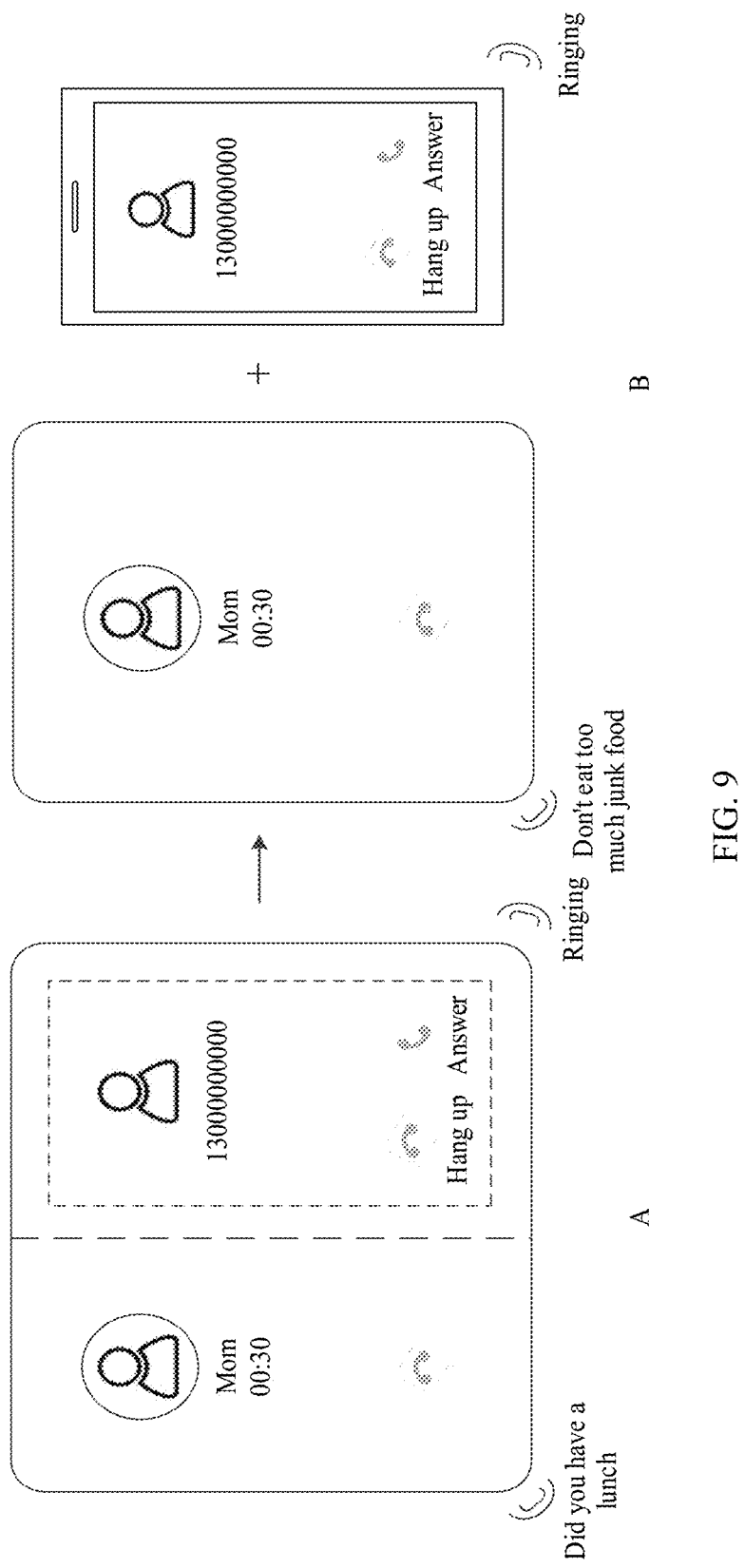
FIG. 9 is a schematic diagram 3 of a scenario according to an embodiment of this application.

For example, FIG. 9 is a schematic diagram 3 of a scenario according to an embodiment of this application. As shown in A in FIG. 9, the head unit is in a call, and in this case, the mobile phone receives an incoming call. In FIG. 9, a left side of the head unit displays the call of the head unit that is in the call, and a right side of the head unit displays an incoming call interface of the mobile phone. In this embodiment of this application, when a conflict of the call function occurs, the head unit may continue to perform the call function, and the mobile phone may perform the call function by using a hardware module of the mobile phone. As shown in B in FIG. 9, the head unit continues to perform the call by using an earpiece and a speaker in the vehicle, and the mobile phone rings by using a speaker of the mobile phone.

The function conflict processing method provided in this embodiment of this application includes: The second device receives the projection data from the first device and the first status information of the first function of the first device, where the first status information indicates the working status of the first function of the first device. If the first function of the second device is in a working state, and the first status information indicates that the first function of the first device is also in a working state, the second device process a conflict of the first function. In this embodiment of this application, after the interface of the first device is projected to the second device, and when the first function of the first device conflicts with the first function of the second device, the second device can process the function conflict, so that the user can normally use the function. In addition, in embodiments of this application, for different functions, processing manners suitable for different functions may be further used to process function conflicts, so that a user requirement is better met, and user experience is improved.

Figure 10:
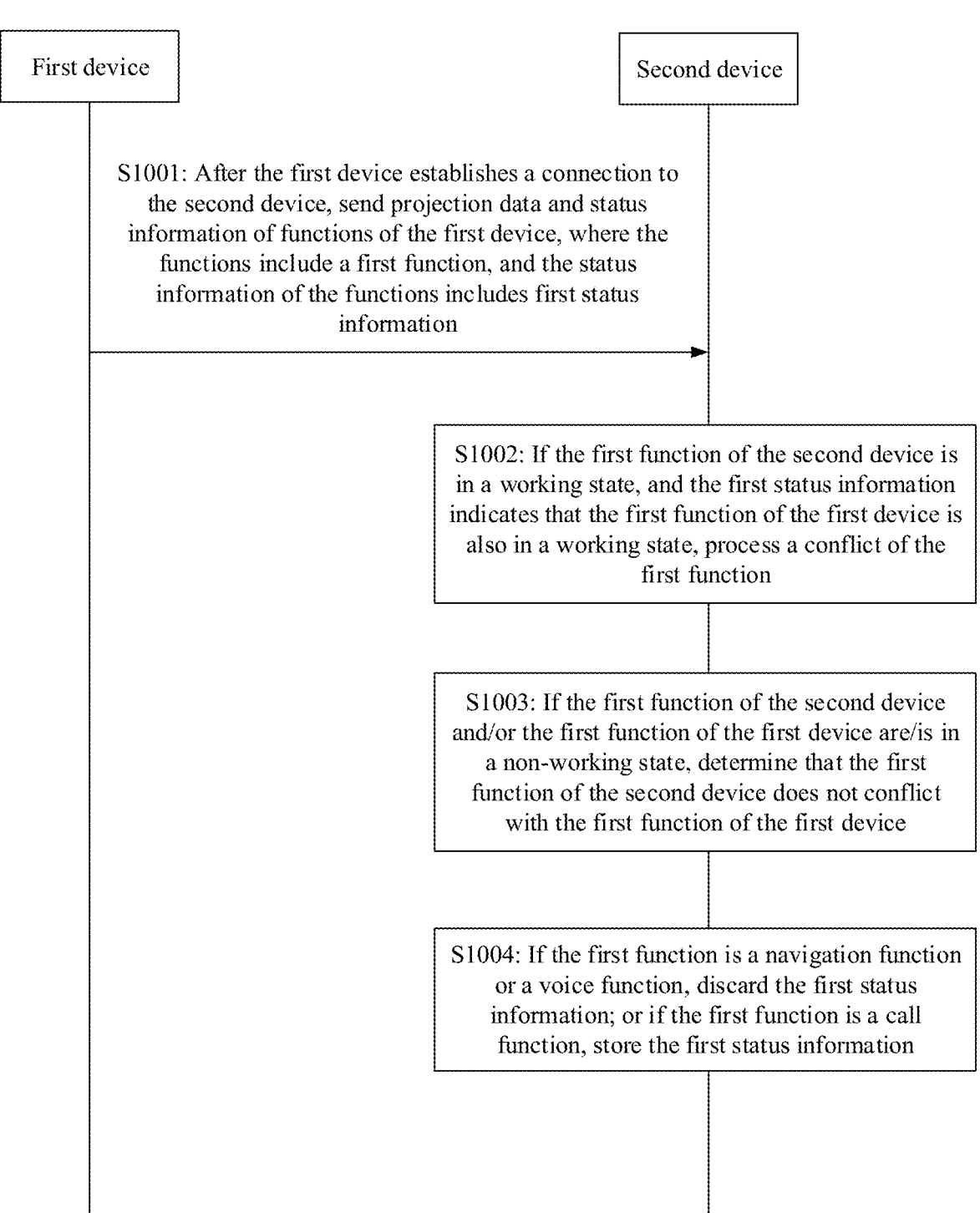
FIG. 10 is a schematic flowchart of another embodiment of a function conflict processing method according to an embodiment of this application.

In the foregoing embodiment, when sending the projection data to the second device, the first device may send the first status information of the first function of the first device to the second device. The first status information may be sent when a projection connection between the first device and the second device is successful, or may be sent when the working status of the first function of the first device changes. The following describes the function conflict processing method in embodiments of this application for the two scenarios. FIG. 10 is a schematic flowchart of another embodiment of a function conflict processing method according to an embodiment of this application. As shown in FIG. 10, the function conflict processing method in this embodiment of this application may include the following steps.

S1001: After a first device establishes a connection to a second device, the second device receives projection data from the first device and status information of functions of the first device, where the functions include a first function, and the status information of the functions includes first status information.

S1002: If the first function of the second device is in a working state, and the first status information indicates that the first function of the first device is also in a working state, the second device processes a conflict of the first function.

S1003: If the first function of the second device and/or the first function of the first device are/is in a non-working state, the second device determines that the first function of the second device does not conflict with the first function of the first device.

S1004: If the first function is a navigation function or a voice function, the second device discards the first status information; or if the first function is a call function, the second device stores the first status information.

It should be understood that one of S1002 and "S1003 and S1004" in this embodiment of this application may be selected and performed. For an implementation in S1002, refer to related descriptions in S402 in the foregoing embodiment.

In S1001, after the first device establishes a connection (for example, the foregoing wired connection or the foregoing Wi-Fi point-to-point connection) to the second device, the first device may send the projection data to the second device, so that an interface of the first device is projected to the second device. In addition, the first device may send the status information of functions of the first device to the second device. The function includes the foregoing first function, and correspondingly, the status information of the functions includes the first status information. For example, after the first device establishes the connection to the second device, the first device may send the projection data and the status information of functions (a call function, a navigation function, and a voice function) to the second device. It should be understood that in this embodiment of this application, when sending status information to the second device for the first time after the first device establishes a connection to the second device, the first device may send the status information of functions of the first device to the second device. It may be figured out that when the first device sends the status information to the second device for the first time, the first device may send the status information of the first function that is in a working state to the second device.

In S1003, after the second device receives the first status information, if the first function of the second device and/or the first function of the first device are/is in a non-working state, the second device determines that the first function of the second device does not conflict with the first function of the first device. For example, if the first function of the second device is in a non-working state, and the first status information indicates that the first function of the first device is in a working state, the second device determines that the first function of the second device does not conflict with the first function of the first device. Alternatively, if the first function of the second device is in a working state, and the first status information indicates that the first function of the first device is in a non-working state, the second device determines that the first function of the second device does not conflict with the first function of the first device. Alternatively, if the first function of the second device is in a non-working state, and the first status information indicates that the first function of the first device is in a non-working state, the second device determines that the first function of the second device does not conflict with the first function of the first device.

In S1004, when the second device determines that the first function of the second device does not conflict with the first function of the first device, in this embodiment of this application, the second device may perform different processing on the first status information based on the first function. If the first function is the navigation function or the voice function, the second device discards the first status information. In this embodiment of this application, if the navigation function or the voice function of the second device is in a working state, when the second device discards the first status information, the second device continues to perform the second function. For example, when the first function is the voice function, the second device may continue to receive sound.

If the first function is the call function, the second device stores the first status information. For example, if the first status information indicates that the call function of the first device is in an idle state, the second device stores the idle state. It should be noted that the second device in this embodiment of this application is a device in a vehicle, for example, a head unit. A function button is further disposed in the vehicle, and the function button is used to trigger the second device to process the first function of the first device. The function control may be a control disposed on a steering wheel of the vehicle, and is referred to as a steering wheel control for short. Alternatively, the function control may be a control displayed on an interface of the head unit. In this embodiment of this application, in different call function application scenarios, when the function button is triggered, the second device processes the call function in different manners.

It should be understood that, in a current technical solution, if the interface of the first device is not projected to the second device, a user operating the function control may trigger the second device to process the call function of the second device. In this embodiment of this application, after the interface of the first device is projected to the second device, the function control may be triggered to implement reverse control. To be specific, when the user operates the function control, the second device may be triggered to process the call function of the first device. It should be noted that in this embodiment of this application, the second device needs to store first status information of the call function because in this embodiment of this application, when the user triggers the function control, the second device may perform different processing on the call function of the first device based on the first status information of the call function. For example, if the first status information is an idle state, when the mobile phone receives an incoming call, the user may trigger the head unit to answer the call of the mobile phone by operating the function control. If the first status information is a call state, the user may trigger, by operating the function control, the head unit to hang up the call of the mobile phone.

It should be understood that the second device may perform different processing on the call function based on the first status information of the call function and an operation action performed by the user on the function control. For example, if the first status information is an idle state, when the mobile phone receives an incoming call, the user may trigger, by performing short pressing on the function control, the head unit to answer the call of the mobile phone, and the user may trigger, by pressing and holding the function control, the head unit to hang up the call of the mobile phone. Alternatively, if the first status information is a call state, the user may trigger, by performing short pressing on the function control, the head unit to hang up the call of the mobile phone. Alternatively, if the first status information is an outgoing call state, the user may trigger, by performing short pressing on the function control, the head unit to hang up the call of the mobile phone. Short pressing means that duration for which the user taps or presses the function control is less than preset duration, and pressing and holding means that duration for which the user taps or presses the function control is greater than preset duration. It should be understood that, in this embodiment of this application, the action of operating the function control by the user may alternatively be sliding, double-tapping, double-pressing, or the like. The foregoing pressing and holding or short pressing by the user on the function control is an example. The processing of the call function of the mobile phone by the head unit "answering or hanging up" is also an example. The processing of the call function of the mobile phone by the head unit may be further call holding, call transfer, or the like. This is not limited in this embodiment of this application.

Figure 11:
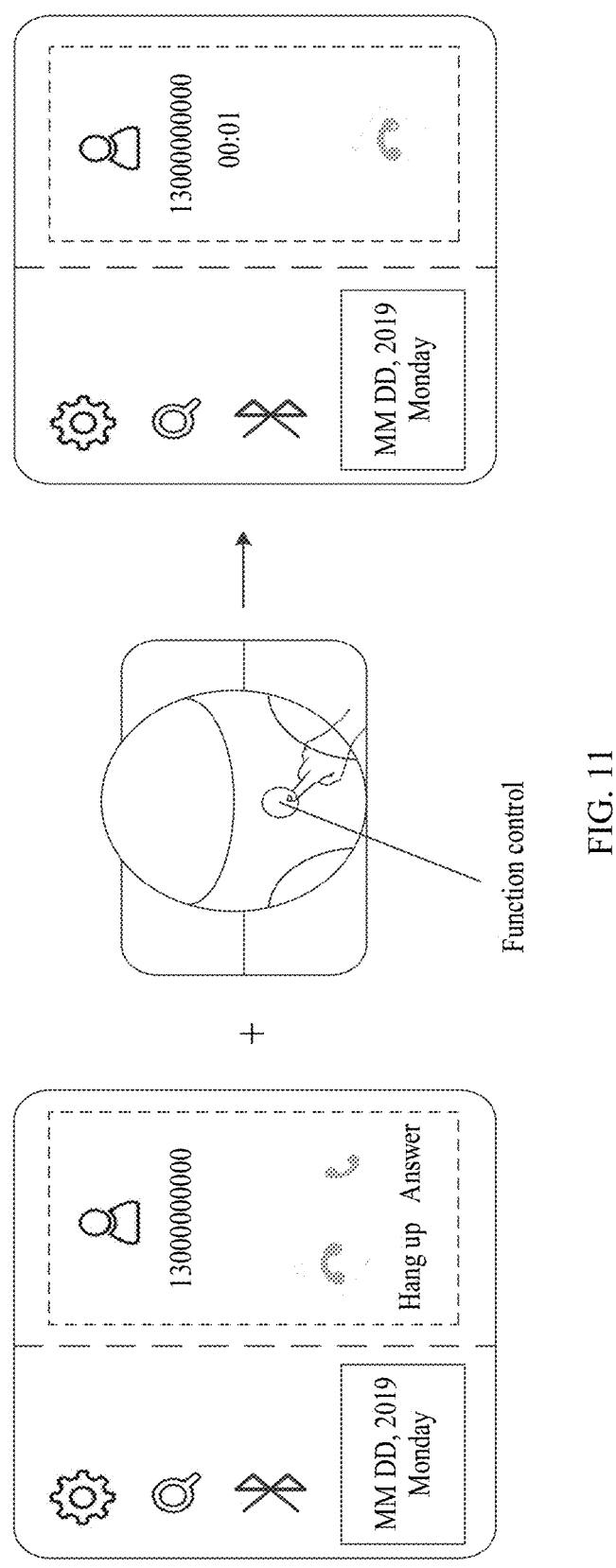
FIG. 11 is a schematic diagram 4 of a scenario according to an embodiment of this application.

The following uses two scenarios as examples to describe the function control. FIG. 11 is a schematic diagram 4 of a scenario according to an embodiment of this application. As shown in A in FIG. 11, an interface of the head unit displays an incoming call interface of a call on the mobile phone. If the function control is a steering wheel control, the user may press the steering wheel control to answer the call of the mobile phone. After the user performs short pressing on the steering wheel control, the head unit may detect that an operation action of the user on the steering wheel control is "short pressing", and the head unit may answer the call of the mobile phone based on stored first status information "an idle state" of the call function of the mobile phone. As shown in B in FIG. 11, an interface of the head unit may display an interface of answering the call of the mobile phone by the head unit.

Figure 12:
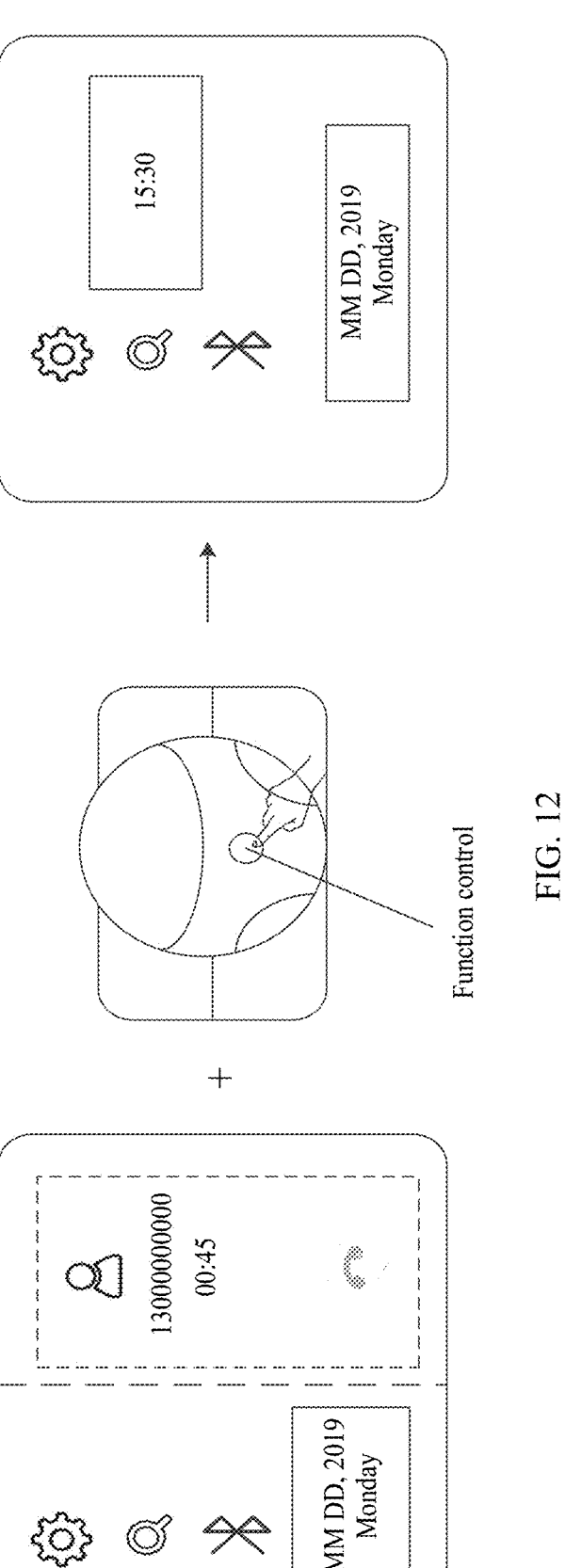
FIG. 12 is a schematic diagram 5 of a scenario according to an embodiment of this application.

FIG. 12 is a schematic diagram 5 of a scenario according to an embodiment of this application. As shown in A in FIG. 12, an interface of the head unit displays an interface of an ongoing call on the mobile phone. If the function control is a steering wheel control, the user may hang up the call of the mobile phone by performing short pressing on the steering wheel control. After the user performs short pressing on the steering wheel control, the head unit may detect that an operation action of the user on the steering wheel control is "short pressing", and the head unit may hang up the call of the mobile phone based on stored first status information "a call state" of the call function of the mobile phone. As shown in B in FIG. 12, an interface of the head unit may display an interface of hanging up the call of the mobile phone by the head unit, such as a home screen of the mobile phone.

Figure 13:
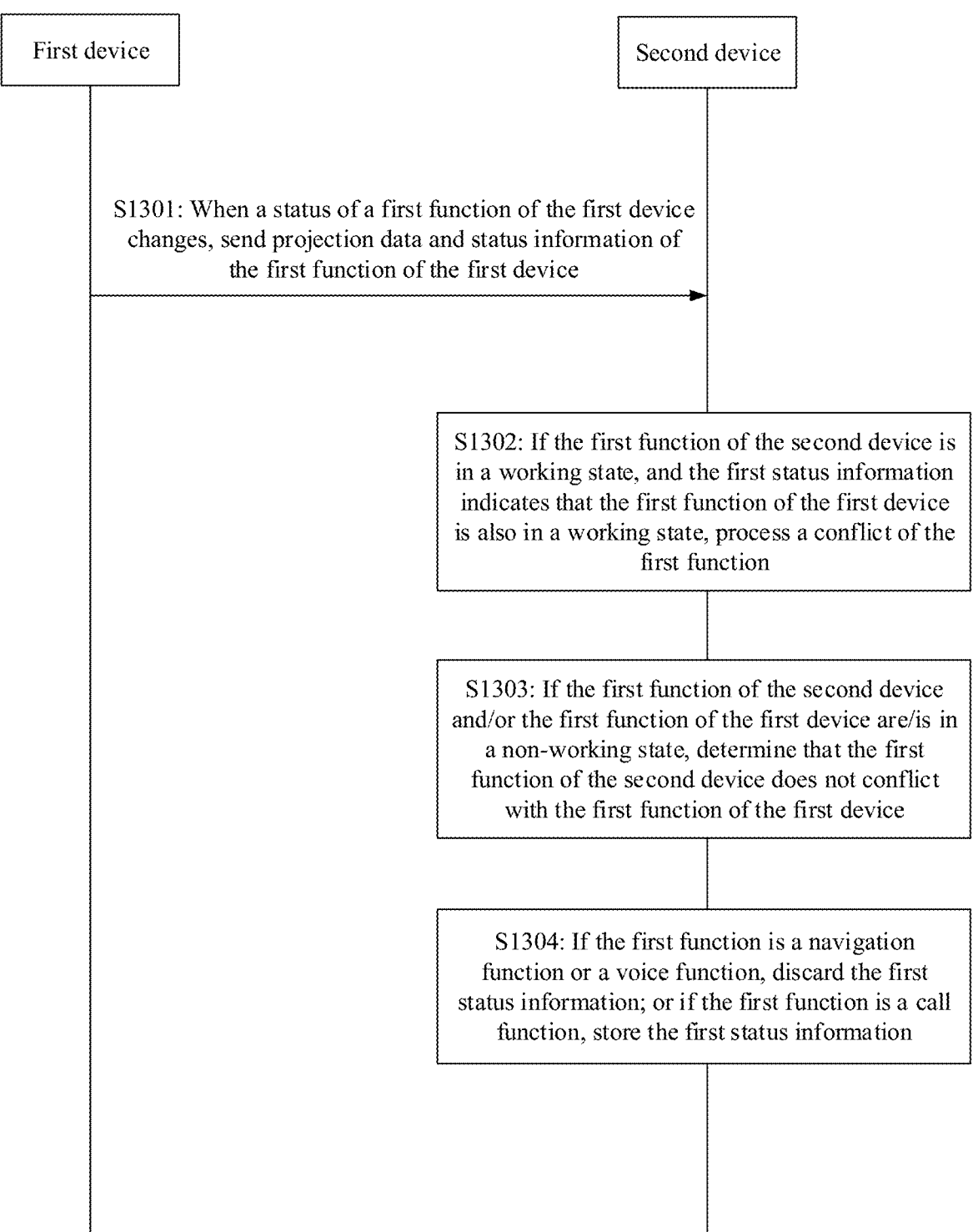
FIG. 13 is a schematic flowchart of still another embodiment of a function conflict processing method according to an embodiment of this application.

FIG. 13 is a schematic flowchart of another embodiment of a function conflict processing method according to an embodiment of this application. As shown in FIG. 13, the function conflict processing method in this embodiment of this application may include the following steps.

S1301: When a status of a first function of a first device changes, the first device sends projection data and status information of the first function of the first device to a second device.

S1302: If the first function of the second device is in a working state, and the first status information indicates that the first function of the first device is also in a working state, the second device processes a conflict of the first function.

S1303: If the first function of the second device and/or the first function of the first device are/is in a non-working state, the second device determines that the first function of the second device does not conflict with the first function of the first device.

S1304: If the first function is a navigation function or a voice function, the second device discards the first status information; or if the first function is a call function, the second device stores the first status information.

It should be understood that for S1302 to S1304 in this embodiment of this application, refer to related descriptions of S1002 to S1004. Details are not described herein again.

A difference between S1301 in this embodiment of this application and S1001 lies in that: In S1001, the first status information of the first function is carried when the first device sends status information to the second device for the first time, and in S1301, the first device sends the projection data and the status information of the first function of the first device to the second device when the status of the first function of the first device changes. That the status of the first function of the first device changes may be understood as: The first function of the first device changes from a working state to a non-working state, or changes from a non-working state to a working state. Alternatively, the call function of the first device changes from an idle state to a call state, or the call function changes from an outgoing call state to an idle state, or the like. In other words, in this embodiment of this application, the first device sends the latest first status information of the first function of the first device to the second device.

In this scenario, an example in which the first function is the voice function is used to describe a voice function processing method of the second device in this embodiment of this application. When the first device exits the voice function, first status information of the voice function changes. Based on the embodiment shown in FIG. 7, after S702, the method may further include the following steps.

S703: The first device sends projection data and new first status information of the voice function of the first device to the second device, where the new first status information indicates that the voice function of the first device is in a non-working state.

S704: The second device resumes performing the voice function.

When the voice function of the first device changes from a working state to a non-working state, the first device sends the projection data and the new first status information to the second device. It should be understood that the projection data herein may be different from the projection data in S701. For example, the projection data in S701 may include related data for performing the voice function by the first device, and the projection data in S703 may include related data for exiting performing the voice function by the first device. The new first status information indicates that the voice function of the first device is in a non-working state. Because the second device stops performing the voice function in S702, and after the second device receives the new first status information, there is no conflict between the voice function of the first device and the voice function of the second device, the second device may resume performing the voice function. For example, the second device may continue to receive sound.

It should be understood that the steps shown in FIG. 13 may be performed after the steps shown in FIG. 10.

In this embodiment of this application, when sending the status information to the second device for the first time, the first device may send the first status information of the first function of the first device to the second device, and the first device may send the first status information to the second device when the status of the first function of the first device changes. In this embodiment of this application, when the first functions do not conflict, the second device performs different processing on the first status information based on different first functions. In addition, in this embodiment of this application, the second device may store the first status information of the call function, so that when the user operates the function control in different operation manners, the second device performs different processing on the call function, so that the function control controls the first function of the first device.

In the foregoing embodiments, the second device processes the conflict of the first function based on the first status information of the first function of the first device. Based on the foregoing embodiment, in this embodiment of this application, not only the first device may send the first status information of the first function of the first device to the second device, but also the second device may send second status information of the first function of the second device to the first device, so that the first device processes a conflict of the first function. FIG. 14 is a schematic flowchart of another embodiment of a function conflict processing method according to an embodiment of this application. It should be understood that the function conflict processing method shown in FIG. 14 and the function conflict processing method shown in FIG. 4 may be performed in no sequence, and the two methods may be performed simultaneously. As shown in FIG. 14, the function conflict processing method provided in this embodiment of this application may include the following steps.

S1401: If a working status of a first function of a second device changes, the second device sends second status information of the first function to a first device, where the second status information indicates the working status of the first function of the second device.

S1402: If the first function of the first function is in a working state, and the second status information indicates that the first function of the second device is also in a working state, the first device processes a conflict of the first function.

S1403: If the first function of the first device and/or the first function of the second device are/is in a non-working state, the first device determines that the first function of the first device does not conflict with the first function of the second device, and the first device discards the second status information.

It should be understood that, for implementations of S1401 to S1403 in this embodiment of this application, refer to related descriptions of S1301 to S1304 in the foregoing embodiment. One of S1402 and S1403 may be selected and performed. It should be noted that, different from FIG. 13, in this embodiment of this application, the first device processes the conflict of the first function. For a manner in which the first device processes the conflict of the first function, refer to related descriptions of processing the conflict of the first function by the second device in the foregoing embodiment.

In this embodiment of this application, not only the first device may send the first status information of the first function of the first device to the second device, but also the second device may send the second status information of the first function of the second device to the first device. In other words, the first device and the second device may share status information of the first function of respective devices. Therefore, both the first device and the second device can process a conflict of the first function when the first functions conflict, so that a user can normally use the function of the device, and user experience is improved.

Figure 15:
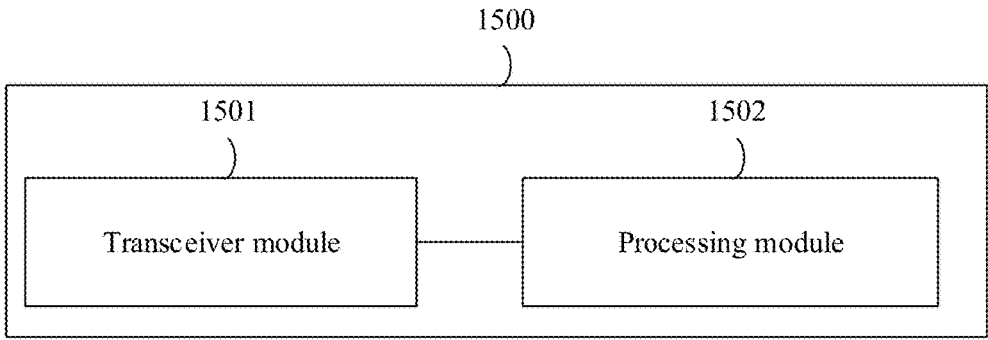
FIG. 15 is a schematic diagram of a structure of a function conflict processing apparatus according to an embodiment of this application.

FIG. 15 is a schematic diagram of a structure of a function conflict processing apparatus according to an embodiment of this application. The function conflict processing apparatus in this embodiment of this application may be the foregoing second device, or may be a chip applied to the second device. The function conflict processing apparatus may be configured to perform actions of the second device in the foregoing method embodiments. As shown in FIG. 15, the function conflict processing apparatus may include a transceiver module 1501 and a processing module 1502.

The transceiver module 1501 is configured to receive projection data from a first device and first status information of a first function of the first device, where the first status information indicates a working status of the first function of the first device.

The processing module 1502 is configured to: if the first function of the second device is in a working state, and the first status information indicates that the first function of the first device is also in a working state, process a conflict of the first function.

In a possible implementation, the processing module 1502 is specifically configured to process a conflict of the first function in a preset processing manner corresponding to the first function.

In a possible implementation, the processing module 1502 is specifically configured to: stop performing the first function of the second device, and output the projection data.

In a possible implementation, the first function is any one of the following: a navigation function or a voice function.

In a possible implementation, the processing module 1502 is specifically configured to perform the first function of the second device, and send an occupation message to the first device, where the occupation message indicates the first device to use a hardware module of the first device to perform the first function.

In a possible implementation, the first function is a call function.

In a possible implementation, the first status information is sent when the working status of the first function of the first device changes; or the first status information is status information in status information of functions sent by the first device when the first device sends status information of a function to the second device for the first time.

In a possible implementation, the processing module 1502 is further configured to: if the first function of the second device and/or the first function of the first device are/is in a non-working state, determine that the first function of the second device does not conflict with the first function of the first device, where if the first function is the navigation function or the voice function, the first status information is discarded, or if the first function is the call function, the first status information is stored.

In a possible implementation, the transceiver module 1501 is specifically configured to: if a working status of the first function of the second device changes, send second status information of the first function to the first device, where the second status information indicates the working status of the first function of the second device.

Figure 16:
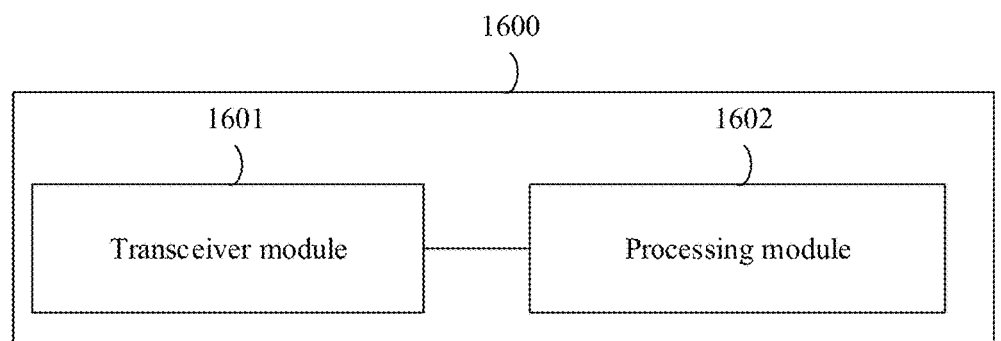
FIG. 16 is a schematic diagram of a structure of another function conflict processing apparatus according to an embodiment of this application.

FIG. 16 is a schematic diagram of a structure of another function conflict processing apparatus according to an embodiment of this application. The function conflict processing apparatus in this embodiment of this application may be the foregoing first device, or may be a chip applied to the first device. The function conflict processing apparatus may be configured to perform actions of the first device in the foregoing method embodiments. As shown in FIG. 16, the function conflict processing apparatus may include a transceiver module 1601 and a processing module 1602.

The transceiver module 1601 is configured to send projection data and first status information of a first function of the first device to a second device, where the first status information indicates a working status of the first function of the first device.

In a possible implementation, the transceiver module 1601 is specifically configured to: when an interface of the first device is projected to the second device, and the first device sends status information of a function to the second device for the first time, send status information of functions of the first device, where the functions include the first function, and the status information of the functions includes the first status information. Alternatively, the transceiver module 1601 is specifically configured to: when an interface of the first device is projected to the second device, and the working status of the first function of the first device changes, send the first status information to the second device.

In a possible implementation, the transceiver module 1601 is further configured to: receive second status information that is from the second device and that is of the first function of the second device, where the second status information is sent when a working status of the first function of the second device changes, and the second status information indicates the working status of the first function of the second device.

Correspondingly, the processing module 1602 is configured to: if the first function of the first device is in a working state, and the second status information indicates that the first function of the second device is also in a working state, process a conflict of the first function.

In a possible implementation, the processing module 1602 is specifically configured to process a conflict of the first function in a preset processing manner corresponding to the first function.

In a possible implementation, the processing module 1602 is specifically configured to stop performing the first function of the first device.

In a possible implementation, the first function is any one of the following: a navigation function or a voice function.

In a possible implementation, the processing module 1602 is specifically configured to perform the first function by using a hardware module of the first device.

In a possible implementation, the first function is a call function.

In a possible implementation, the processing module 1602 is further configured to: if the first function of the first device and/or the first function of the second device are/is in a non-working state, determine, by the first device, that the first function of the first device does not conflict with the first function of the second device, where the first device discards the second status information.

In a possible implementation, the processing module 1602 is further configured to: if the first device receives an occupation message from the second device, perform the first function by using the hardware module of the first device.

Implementation principles and technical effects of the function conflict processing apparatuses provided in embodiments of this application are similar, and details are not described herein again.

It should be noted that understandably, the transceiver module may be a transceiver or include a transmitter and a receiver in actual implementation. The processing module may be implemented in a form of software invoked by a processing element, or in a form of hardware. For example, the processing module may be a separately disposed processing element, or may be integrated into a chip of the foregoing apparatus for implementation. In addition, the processing module may be stored in a memory of the foregoing apparatus in a form of program code, and may be invoked by a processing element of the foregoing apparatus to perform a function of the foregoing processing module. In addition, all or some of these modules may be integrated together, or may be implemented independently. The processor element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be configured as one or more integrated circuits for performing the foregoing methods, for example, one or more application specific integrated circuits (ASICs), one or more microprocessors (DSPs), or one or more field programmable gate arrays (FPGAs). For another example, when one of the foregoing modules is implemented in a form of program code invoked by a processing element, the processing element may be a general-purpose processor, for example, a central processing unit (CPU) or another processor that can invoke the program code. For another example, these modules may be integrated together and implemented in a form of a system-on-a-chip (SOC).

Figure 17:
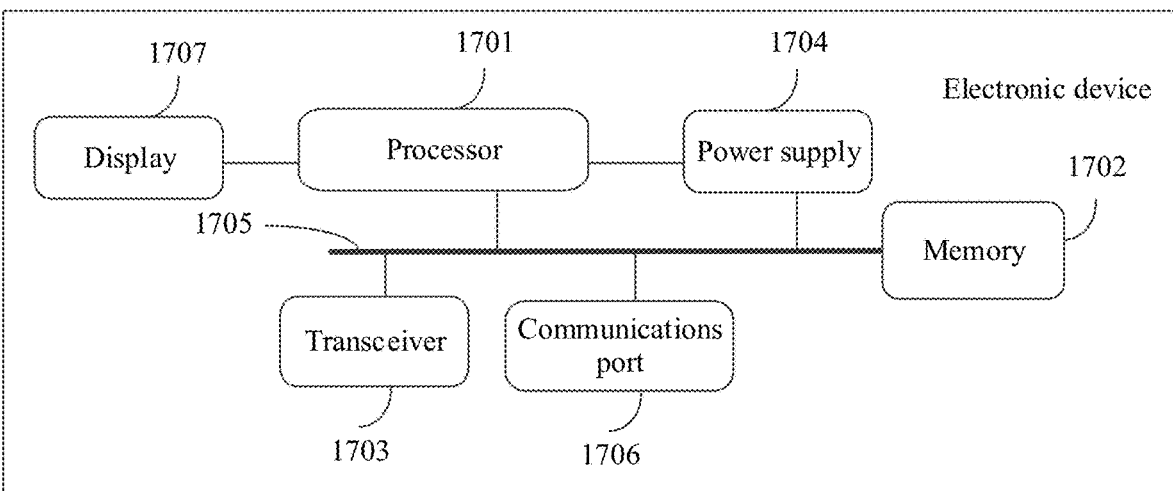
FIG. 17 is a schematic diagram of a structure of an electronic device according to an embodiment of this application.

FIG. 17 is a schematic diagram of a structure of an electronic device according to an embodiment of this application. The electronic device shown in FIG. 17 may be the first device or the second device in the foregoing embodiment. As shown in FIG. 17, the electronic device may include a processor 1701 (for example, a CPU), a memory 1702, and a transceiver 1703. The transceiver 1703 is coupled to the processor 1701, and the processor 1701 controls a sending and receiving action of the transceiver 1703. The memory 1702 may include a high-speed random access memory (RAM), or may further include a non-volatile memory (NVM), for example, at least one magnetic disk memory. The memory 1702 may store various instructions to complete various processing functions and implement method steps in this application. Optionally, the electronic device in this application may further include a power supply 1704, a communications bus 1705, a communications port 1706, and a display 1707. The transceiver 1703 may be integrated into a transceiver of the electronic device, or may be an independent transceiver antenna on the electronic device, and is configured to perform the actions performed by the transceiver module in the foregoing embodiment. The communications bus 1705 is configured to implement a communication connection between elements. The display 1707 is configured to display a user interface of the electronic device. The communications port 1706 is configured to implement connection and communication between the electronic device and another peripheral.

In this embodiment of this application, the memory 1702 is configured to store computer-executable program code, and the program code includes instructions. When the processor 1701 executes the instructions, the instructions enable the processor 1701 of the electronic device to perform a processing action of the electronic device in the foregoing method embodiment, and enable the transceiver 1703 to perform sending and receiving actions of the electronic device in the foregoing method embodiment. Implementation principles and technical effects thereof are similar, and details are not described herein again.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The term "a plurality of" in this specification means two or more than two. A term "and/or" in this specification describes only an association relationship between associated objects and indicates that there may be three relationships. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

It may be understood that various numbers in embodiments of this application are merely used for differentiation for ease of description, and are not used to limit the scope of embodiments of this application.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

What is claimed is:

1. A function conflict processing method, comprising:
receiving, from a first device and by a second device, projection data for projecting an interface of the first device on the second device and first status information of a first function of the first device indicating a working status of the first function of the first device;
displaying the interface of the first device on the second device based on the projection data; and
in response to determining that: (1) the first status information indicates that the first function of the first device is in a working state and (2) a first function of the second device is in a working state, processing, by the second device, a conflict of the first function, wherein processing the conflict of the first function comprises:
performing, by the second device, the first function of the second device;
sending an occupation message to the first device, wherein the occupation message indicates the first device to use a speaker of the first device to perform the first function;
stopping performing the first function of the second device; and
outputting the projection data.

2. The method according to claim 1, wherein the first function is a navigation function or a voice function.

3. The method according to claim 1, wherein the first function is a call function.

4. The method according to claim 1, wherein the first status information is sent in response to the working status of the first function of the first device changes.

5. The method according to claim 1, wherein the first status information is in status information of functions sent by the first device when the first device sends status information of a function to the second device for a first time.

6. The method according to claim 1, wherein the method further comprises:
if at least one of the first function of the second device or the first function of the first device is in a non-working state, determining, by the second device, that the first function of the second device does not conflict with the first function of the first device; and
if the first function is a navigation function or a voice function, discarding, by the second device, the first status information.

7. The method according to claim 1, wherein the method further comprises:
if at least one of the first function of the second device or the first function of the first device is in a non-working state, determining, by the second device, that the first function of the second device does not conflict with the first function of the first device; and
if the first function is a call function, storing, by the second device, the first status information.

8. The method according to claim 1, wherein the method further comprises:
in response to determining that a working status of the first function of the second device changes, sending second status information of the first function to the first device, wherein the second status information indicates the working status of the first function of the second device.

9. A function conflict processing method, comprising:
sending, by a first device and to a second device, projection data to project an interface of the first device on the second device and first status information of a first function of the first device indicating that a working status of the first function of the first device is a working state for the second device to display the interface based on the projection data and process a conflict of the first function when the second device is in the working state, wherein processing the conflict of the first function comprises:
performing, by the second device, the first function of the second device;
sending an occupation message to the first device, wherein the occupation message indicates the first device to use a speaker of the first device to perform the first function;
stopping performing the first function of the second device; and
outputting the projection data.

10. The method according to claim 9, wherein an interface of the first device is projected to the second device, and wherein the sending, by a first device, first status information to a second device comprises:
in response to determining that the first device sends status information of a function to the second device for a first time, sending, by the first device, status information of functions of the first device to the second device, wherein the functions comprise the first function, and the status information of the functions comprises the first status information; and
in response to determining that the working status of the first function of the first device changes, sending, by the first device, the first status information to the second device.

11. The method according to claim 9, wherein the method further comprises:

receiving, by the first device from the second device, second status information of the first function of the second device, wherein the second status information is sent in response to a working status of the first function of the second device changes, and the second status information indicates the working status of the first function of the second device; and in response to determining that the first function of the first device is in a working state and the second status information indicates that the first function of the second device is in a working state, processing, by the first device, a conflict of the first function.

12. The method according to claim 9, wherein the first function is at least one of a navigation function or a voice function.

13. An electronic device comprising:

at least one processor; and a memory coupled to the at least one processor and storing computer-executable instructions for execution by the at least one processor to perform operations comprising:

receiving, from a first device, projection data for projecting an interface of the first device on the electronic device and first status information of a first function of the first device indicating a working status of the first function of the first device;

displaying the interface of the first device on the electronic device based on the projection data; and in response to determining that: (1) the first status information indicates that the first function of the first device is also in a working state and (2) a first function of the electronic device is in a working state, processing a conflict of the first function, wherein processing the conflict of the first function comprises:

performing, by the electronic device, the first function of the electronic device;

sending an occupation message to the first device, wherein the occupation message indicates the first device to use a speaker of the first device to perform the first function;

stopping performing the first function of the electronic device; and outputting the projection data.

14. An electronic device comprising:

at least one processor; and a memory coupled to the at least one processor and storing computer-executable instructions for execution by the at least one processor to perform operations comprising:

sending projection data to a second device to project an interface of the electronic device on the second device; and sending first status information of a first function of the electronic device indicating that the first function of electronic device is in a working state for the second device to display the interface based on the projection data and process a conflict of the first function when the second device is in the working state, wherein processing the conflict of the first function comprises:

performing, by the second device, the first function of the second device;

sending an occupation message to the electronic device, wherein the occupation message indicates the electronic device to use a speaker of the electronic device to perform the first function;

stopping performing the first function of the second device; and outputting the projection data.

* * * * *